United States Patent
Li et al.

(10) Patent No.: US 9,918,290 B2
(45) Date of Patent: Mar. 13, 2018

(54) METHODS AND APPARATUS FOR INTER-CELL DEVICE-TO-DEVICE COMMUNICATION AND DISCOVERY

(71) Applicant: Samsung Electronics Co., Ltd., Suwon-si, Gyeonggi-do (KR)

(72) Inventors: Ying Li, Bridgewater, NJ (US); Thomas David Novlan, Dallas, TX (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 106 days.

(21) Appl. No.: 14/747,966

(22) Filed: Jun. 23, 2015

(65) Prior Publication Data

US 2016/0021625 A1    Jan. 21, 2016

Related U.S. Application Data

(60) Provisional application No. 62/027,010, filed on Jul. 21, 2014, provisional application No. 62/030,438, (Continued)

(51) Int. Cl.
*H04J 3/00* (2006.01)
*H04W 56/00* (2009.01)
(Continued)

(52) U.S. Cl.
CPC .............. *H04W 56/00* (2013.01); *H04B 1/38* (2013.01); *H04W 8/005* (2013.01); (Continued)

(58) Field of Classification Search
CPC . H04W 56/00; H04W 8/005; H04W 72/0446; H04W 72/1289; H04W 76/03; H04B 1/38
See application file for complete search history.

(56) References Cited

U.S. PATENT DOCUMENTS

| | | |
|---|---|---|
| 2013/0308551 A1 | 11/2013 | Madan et al. |
| 2013/0322388 A1 | 12/2013 | Ahn et al. |
| 2015/0215903 A1* | 7/2015 | Zhao ............... H04W 72/04 370/329 |

FOREIGN PATENT DOCUMENTS

KR    10-2012-0074255    7/2012

OTHER PUBLICATIONS

Ericsson (R1-141381, synchronization procedures for D2D Discovery and communication, Mar. 31-Apr. 4, 2014, Meeting #76bis, Schenzhen China).*

(Continued)

*Primary Examiner* — Maharishi Khirodhar

(57) ABSTRACT

A method includes detecting a device to device (D2D) synchronization signal of a neighbor base station, transmitted from at least one other UE associated with the neighbor base station through a transceiver, determining at least one UE receive (RX) resource pool configured by the neighbor base station based on the D2D synchronization signal of the neighbor base station, and monitoring a D2D discovery or communication signal transmitted from the at least one other UE according to the at least one UE RX resource pool through the transceiver. A method includes determining at least one UE RX resource pool for at least one device associated with a base station, each UE RX resource pool comprising a repetition of a Scheduling Assignment (SA) pool and a data pool with a scheduling cycle, the SA pool comprising a SA bitmap, and the data pool comprising at least one repeated data bitmap.

16 Claims, 20 Drawing Sheets

Related U.S. Application Data filed on Jul. 29, 2014, provisional application No. 62/046,660, filed on Sep. 5, 2014, provisional application No. 62/056,181, filed on Sep. 26, 2014, provisional application No. 62/062,610, filed on Oct. 10, 2014, provisional application No. 62/018,306, filed on Jun. 27, 2014.

(51) Int. Cl.
*H04B 1/38* (2015.01)
*H04W 72/04* (2009.01)
*H04W 8/00* (2009.01)
*H04W 72/12* (2009.01)
*H04W 76/02* (2009.01)

(52) U.S. Cl.
CPC ... *H04W 72/0446* (2013.01); *H04W 72/1289* (2013.01); *H04W 76/023* (2013.01)

(56) References Cited

OTHER PUBLICATIONS

Ericsson (R1-140774, synchronization signals and channel design for D2D discovery and communication, Feb. 10-14, 2014, Meeting #76, Prague, Czech Republic).*

Institute for information industry (R1-140425, Meeting #76, resource pool configuration for partial coverage scenario, Feb. 10-14, 2014, Prague, Czech Republic).*

International Search Report and Written Opinion issued for PCT/KR2015/006599 dated Sep. 30, 2015, 10 pgs.

Extended European Search Report issued for EP 15174138.6 dated Nov. 25, 2015, 14 pgs.

Samsung, "D2D Synchronization Signal and Channel Design", R1-142120, 3GPP TSG RAN WG1 #77, dated May 18, 2014, 6 pgs.

Samsung, "Mode 2 Resource Allocation for D2D Broadcast Communication", R1-142111, 3GPP TSG RAN WG1 Meeting #77, dated May 18, 2014, 6 pgs.

Institute for Information Industry (III), "Resource Pool Configuration for Partial Coverage Scenarios", R1-140425, 3GPP TSG RAN WG1 Meeting #76, dated Feb. 9, 2014, 3 pgs.

Ericsson, "Synchronization Procedures for D2D Discovery and Communication", R1-141381, 3GPP TSG RAN WG1 Meeting #76bis, dated Mar. 30, 2014, 5 pgs.

Ericsson, "Synchronization Signals and Channel Design for D2D Discovery and Communication", R1-141380, 3GPP TSG RAN WG1 Meeting #76bis, dated Mar. 30, 2014, 9 pgs.

General Dynamics, "Resource Pool Configuration for D2D Communication", R2-141609, 3GPP TSG RAN2 #85bis, dated Mar. 22, 2014, 7 pgs.

ZTE, "Discussion of D2D Discovery", R1-133149, 3GPP TSG-RAN WG1 #74, dated Aug. 19, 2013, 10 pgs.

Patil, Shailesh, "[77-20] RRC Parameter List and LS for D2D, 3GPP TSG RAN WG1 Archives", dated Jun. 10, 2014, 9 pages.

Patil, Shailesh, "R1-14xxxx L1 parameters for Rel-12 ITE D2D.xls (59 lines), 3GPP TSG RAN WG1 Archives", dated Jun. 10, 2014, 5 pages.

Patil, Shailesh, "R1-14xxxx.doc (59 lines), 3GPP TSG RAN WG1 Archives", dated Jun. 10, 2014, 1 page.

* cited by examiner

METHODS AND APPARATUS FOR INTER-CELL DEVICE-TO-DEVICE COMMUNICATION AND DISCOVERY

CROSS-REFERENCE TO RELATED APPLICATION AND CLAIM OF PRIORITY

The present application claims priority to U.S. Provisional Patent Application Ser. No. 62/018,306, filed Jun. 27, 2014, entitled "METHODS AND APPARATUS FOR INTER-CELL DEVICE-TO-DEVICE COMMUNICATION AND DISCOVERY". The present application claims priority to U.S. Provisional Patent Application Ser. No. 62/027,010, filed Jul. 21, 2014, entitled "METHODS AND APPARATUS FOR INTER-CELL DEVICE-TO-DEVICE COMMUNICATION AND DISCOVERY". The present application claims priority to U.S. Provisional Patent Application Ser. No. 62/030,438, filed Jul. 29, 2014, entitled "METHODS AND APPARATUS FOR INTER-CELL DEVICE-TO-DEVICE COMMUNICATION AND DISCOVERY". The present application claims priority to U.S. Provisional Patent Application Ser. No. 62/046,660, filed Sep. 5, 2014, entitled "METHODS AND APPARATUS FOR INTER-CELL DEVICE-TO-DEVICE COMMUNICATION AND DISCOVERY". The present application claims priority to U.S. Provisional Patent Application Ser. No. 62/056,181, filed Sep. 26, 2014, entitled "METHODS AND APPARATUS FOR INTER-CELL DEVICE-TO-DEVICE COMMUNICATION AND DISCOVERY". The present application claims priority to U.S. Provisional Patent Application Ser. No. 62/062,610, filed Oct. 10, 2014, entitled "METHODS AND APPARATUS FOR INTER-CELL DEVICE-TO-DEVICE COMMUNICATION AND DISCOVERY". The content of the above-identified patent document is incorporated herein by reference.

TECHNICAL FIELD

The present application relates generally to the device to device (D2D) discovery and communication and in the wireless network and, more specifically, to a method and device for performing synchronization and resource pool configuration for the inter-cell D2D discovery and communication.

BACKGROUND

Traditionally cellular networks have been designed to establish wireless communications links between mobile devices or User Equipments (UEs) and fixed communication infrastructure (for example, base stations, access points, or enhanced NodeBs (eNBs)) which serve users in a wide or local geographic range. A wireless network however can also be implemented by utilizing D2D communication links with the assistance of infrastructure or without the need for deployed access points. A communication network can support devices which can connect both to access points (infrastructure mode) and other D2D-enabled devices. A D2D-enabled device is referred to as a D2D UE.

The D2D communication may be used to implement many kinds of services that are complementary to the primary communication network or provide new services based on the flexibility of the network topology. The LTE D2D multicast communication such as broadcasting or groupcasting has been identified as a potential means for D2D communication where UEs are able to transmit messages to all in-range D2D-enabled UEs or a subset of UEs which are members of particular group. Future public safety networks are expected to require devices to operate in near simultaneous fashion when switching between cellular and D2D communication modes. As a result, there is a need for protocols which can manage D2D communication in these deployment scenarios.

SUMMARY

In a first embodiment, a method for device-to-device (D2D) communication in wireless communication system is provided. The method comprises detecting a D2D synchronization signal of a neighbor base station, transmitted from the at least one other UE associated with the neighbor base station through a transceiver, determining at least one UE receive (RX) resource pool configured by the neighbor base station based on the determined D2D synchronization signal of the neighbor base station, and monitoring a D2D discovery or communication signal transmitted from the at least one other UE according to the at least one UE RX resource pool through the transceiver.

In a second embodiment, a method for device-to-device (D2D) communication in a wireless communication network is provided. the method includes determining at least one UE RX resource pool for at least one device associated with a base station, each UE RX resource pool comprising a repetition of a Scheduling Assignment (SA) pool and a data pool with a scheduling cycle, the SA pool comprising a SA bitmap, and the data pool comprising at least one repeated data bitmap, transmitting the determined at least one UE RX resource pool to the at least one device, wherein the SA pool starts with an offset from a start of the scheduling cycle, and the data pool starts with an offset from either the start of the scheduling cycle, a start of the SA pool, or an end of the SA pool.

In a third embodiment, a device for device-to-device (D2D) communication in wireless communication system is provided. the device includes a transceiver configured to communicate with another device, a processor configured to in response to detect the D2D synchronization signal of a neighbor base station, transmitted from at least one other UE associated with the neighbor base station through the transceiver, determine at least one UE receive (RX) resource pool configured by the neighbor base station based on the detected D2D synchronization signal of the neighbor base station, and monitor a D2D discovery or communication signal transmitted from the at least one other UE according to the at least one UE RX resource pool through the transceiver.

In a forth embodiment, a base station for device-to-device (D2D) communication in a wireless communication network is provided. the base station includes a processor configured to determine at least one UE RX resource pool for at least one device associated with the base station, each UE RX resource pool comprising a repetition of a Scheduling Assignment (SA) pool and a data pool with a scheduling cycle, the SA pool comprising a SA bitmap, and the data pool comprising at least one repeated data bitmap, a transceiver configured to transmit the determined at least one UE RX resource pool to the at least one device, wherein the SA pool starts with an offset from a start of the scheduling cycle, and the data pool starts with an offset from either the start of the scheduling cycle, a start of the SA pool, or an end of the SA pool.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

The following documents and standards descriptions are hereby incorporated into the present disclosure as if fully set forth herein: 3GPP TS 36.211 version 11.2.0, "E-UTRA, Physical channels and modulation"; 3GPP TS 36.212 version 11.2.0, "E-UTRA, Multiplexing and Channel coding"; 3GPP TS 36.213 version 11.2.0, "E-UTRA, Physical Layer Procedures"; 3GPP TS 36.331 version 11.2.0, "E-UTRA, Radio Resource Control (RRC) Protocol Specification"; 3GPP TSG RAN RP-122009. "Study on LTE Device to Device Proximity Services"; and 3GPP TR 22.803 version 1.1.0. "Feasibility Study for Proximity Services (ProSe)."

Figure 1:
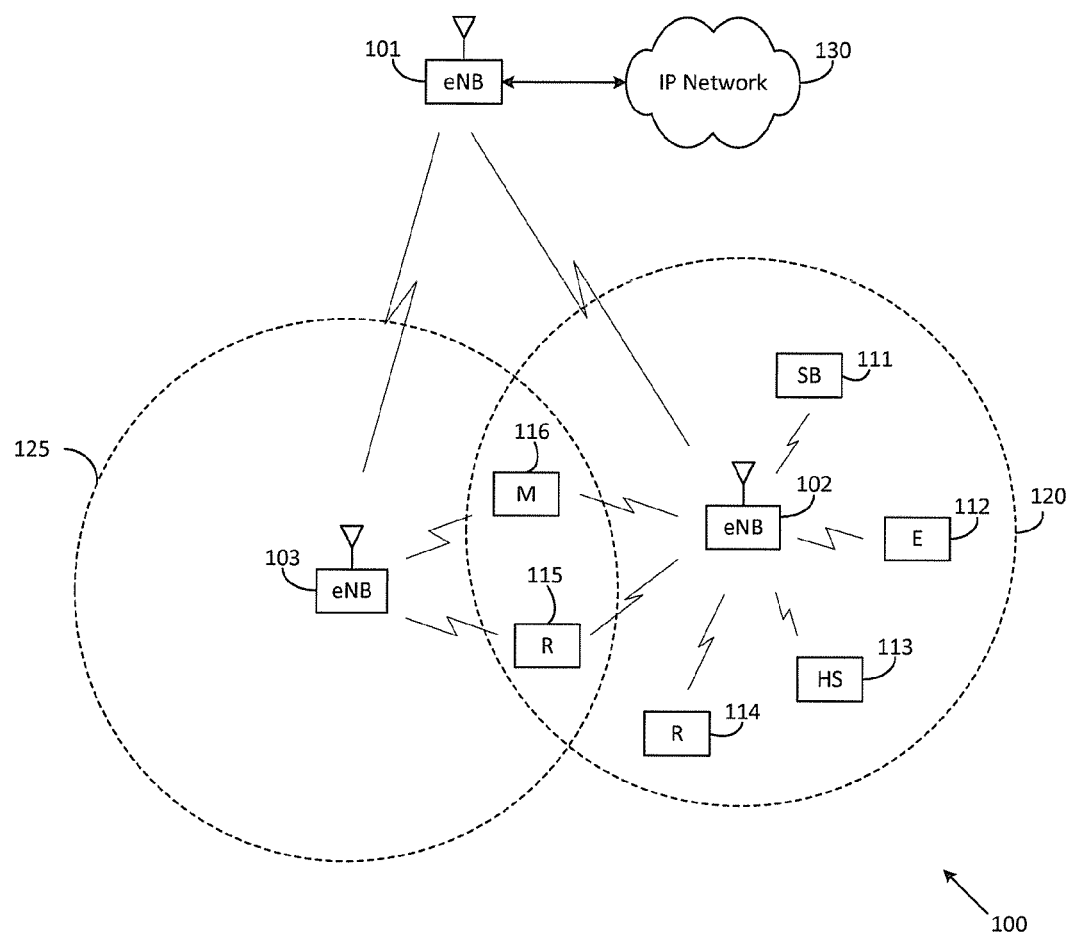
FIG. 1 illustrates an example wireless network according to embodiments of the present disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 support continuity of a Single Radio Voice Call Continuity (SRVCC) handover as described in embodiments of the present disclosure. In some embodiments, one or more of BS 101, BS 102 and BS 103 support communications between entities, such as web Real Time Communication (RTC).

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
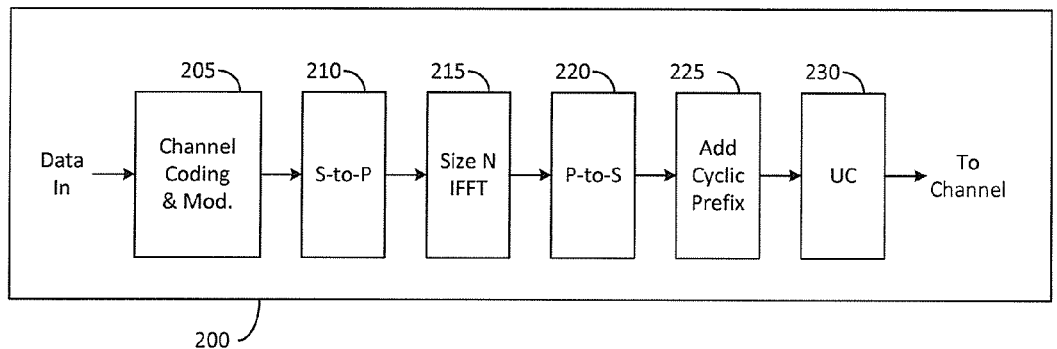
FIGS. 2A and 2B illustrate example wireless transmit and receive paths according to embodiments of the present disclosure.
Figure 2B:
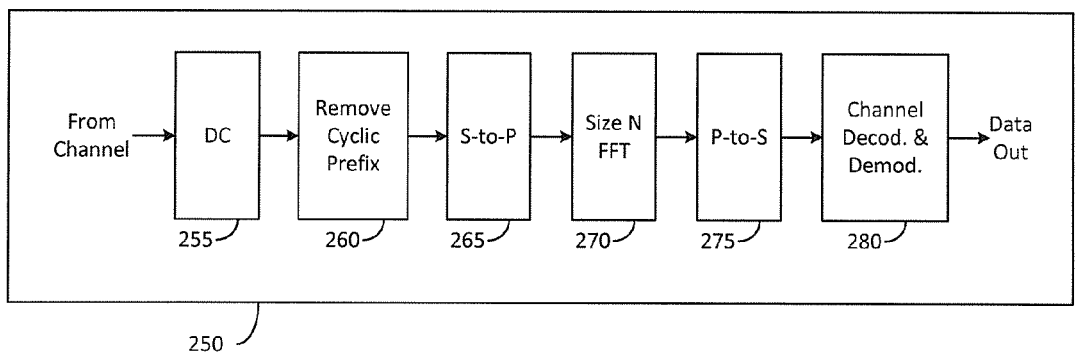

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support continuity of a Single Radio Voice Call Continuity (SRVCC) handover as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
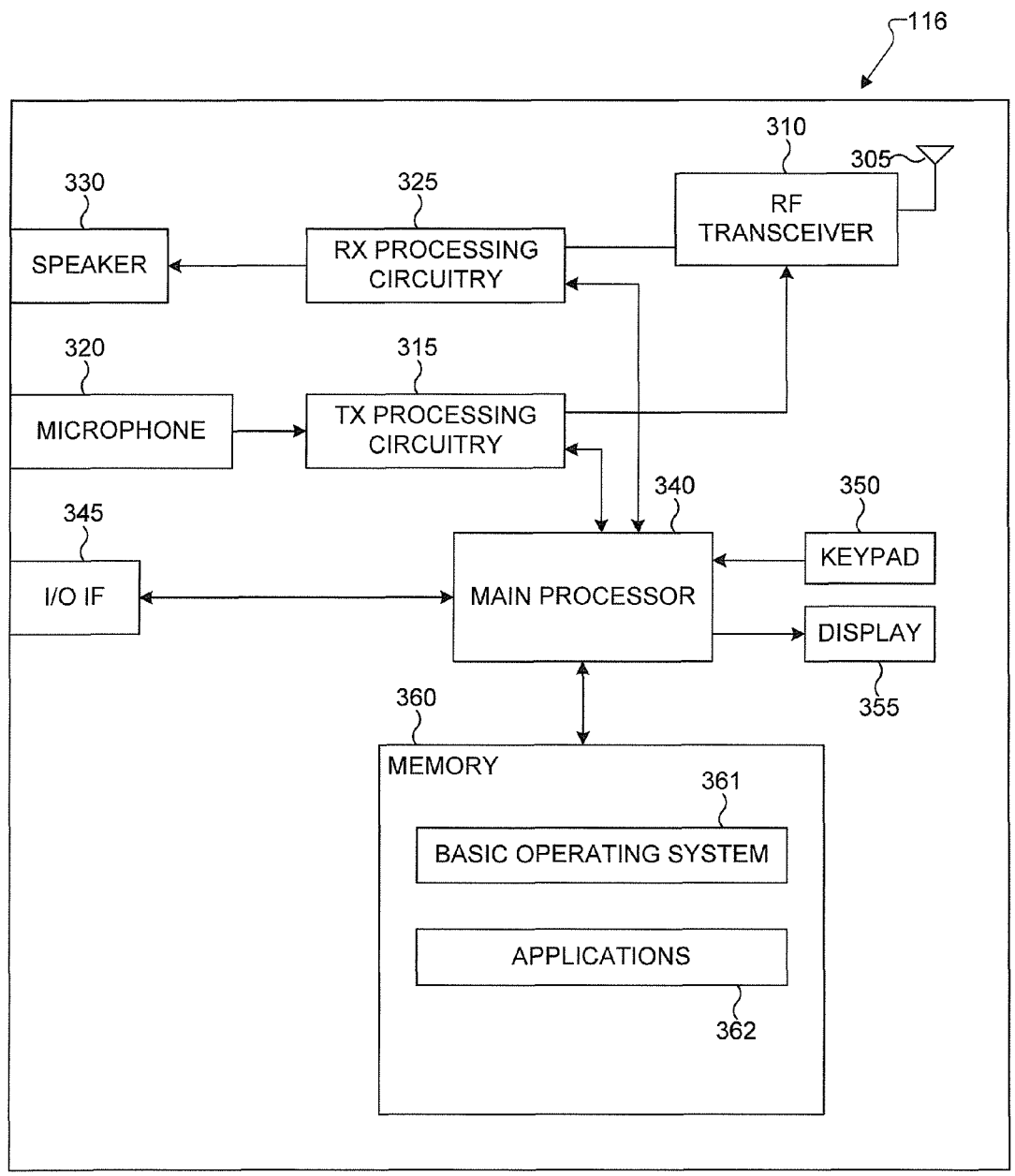
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

As shown in FIG. 3A, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for continuity of a SRVCC handover as described in embodiments of the present disclosure. For example, the main processor 340 can be able to indicate to a serving eNB that the SRVCC handover is not applicable and in response to the voice session initiated via the regular RTC IMS client, the main processor 340 can be able to cause the RF transceiver 310 to indicate to the serving eNB that the SRVCC handover is applicable. The main processor 340 can move data into or out of the memory 360 as required by an executing process. In some embodiments, the main processor 340 is conFIGUREd to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 conFIGUREd as a mobile telephone or smartphone, UEs could be conFIGUREd to operate as other types of mobile or stationary devices.

Figure 3B:
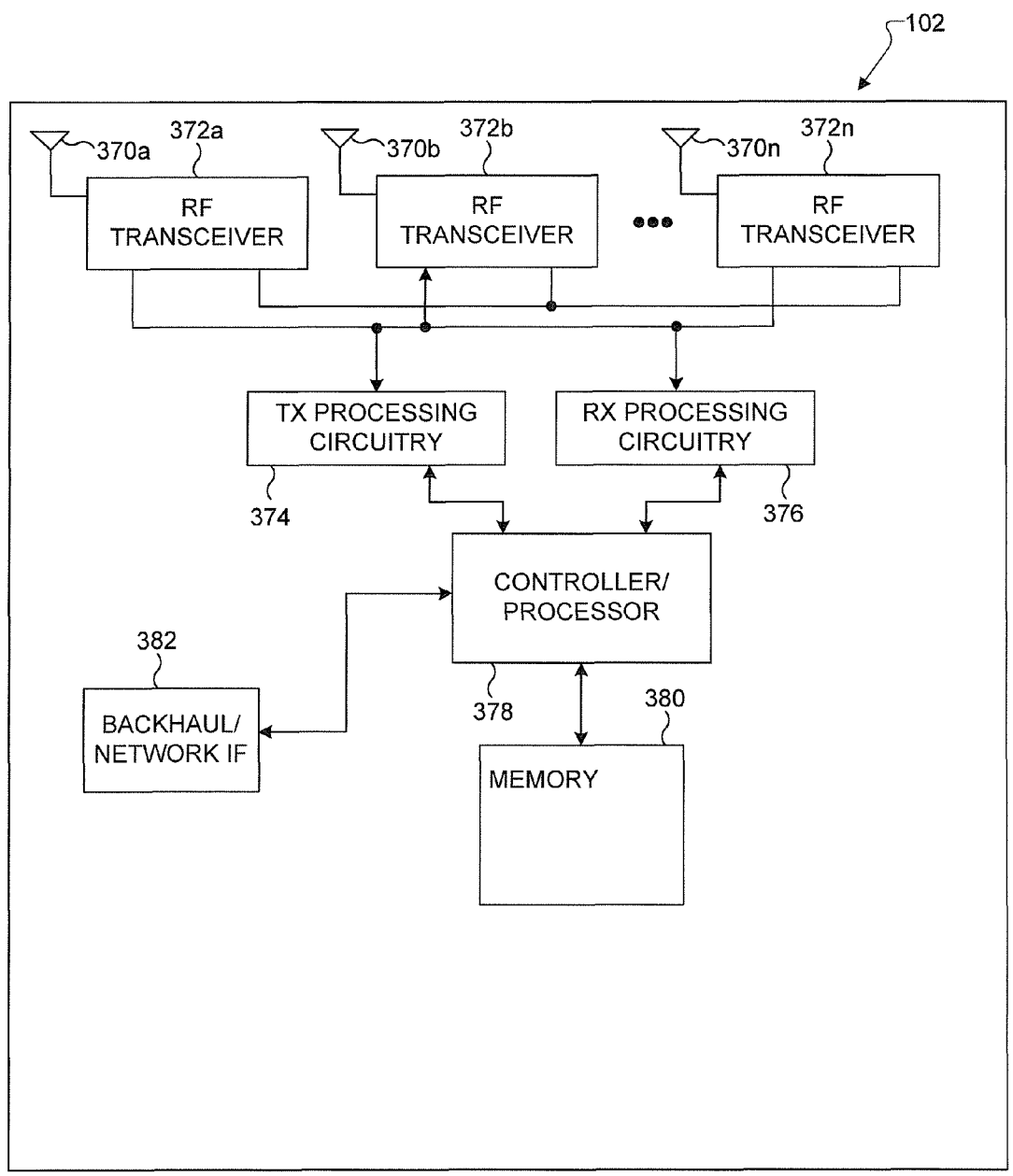
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting continuity of a Single Radio Voice Call Continuity (SRVCC) handover as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions is conFIGUREd to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
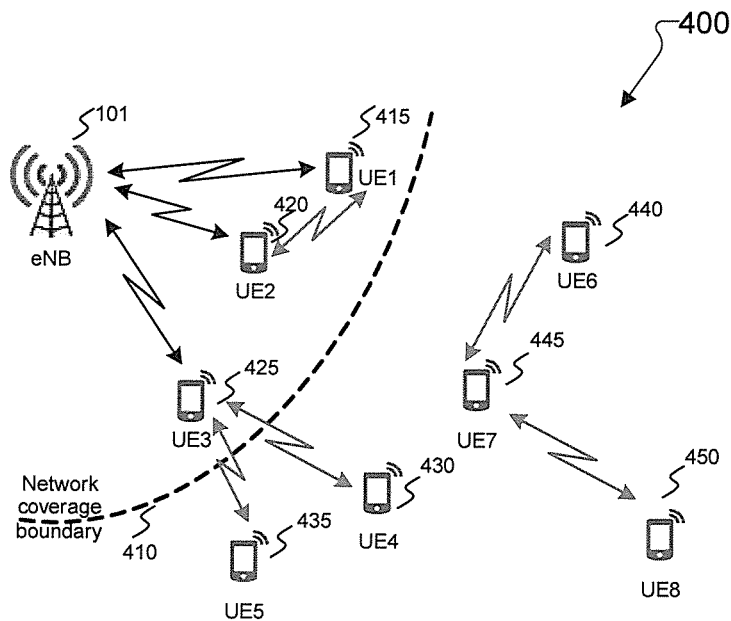
FIG. 4 illustrates a topology of D2D communication networks according to embodiments of the present disclosure.

FIG. 4 illustrates a topology of D2D communication networks 400 according to embodiments of the present disclosure. The embodiment shown in FIG. 4 is for illustration only. Other embodiments could be used without departing from the scope of the present disclosure.

Referring to FIG. 4, eNB 101 can communicate with UE1 415, UE2 420, UE3 425 within network coverage boundary 410. All the other UEs in the FIGURE are out of the network coverage. UE1 415 and UE2 420 can have D2D communication. UE3 425 can have D2D communication with UE4 430 and UE5 435. UE6 440 can have D2D communication with UE7 445, and UE7 445 can have D2D communication with UE8 450.

For a D2D transmission, a UE can use uplink (UL) resources. The UL resources may vary depending on whether the system uses frequency-division duplexing (FDD) or time-division duplexing (TDD), and what the TDD UL-downlink (DL) configuration is. In a TDD communication system, the communication direction in some subframes is in the DL and in some other subframes is in the UL. The below Table 1 lists indicative UL-DL configurations over a period of 10 subframes which is also referred to as frame period. "D" denotes a DL subframe, "U" denotes an UL subframe, and "S" denotes a special subframe, which includes a DL transmission field referred to as DwPTS, a Guard Period (GP), and an UL transmission field referred to as UpPTS. Several combinations exist for the duration of each field in a special subframe, subject to the condition that the total duration is one subframe.

TABLE 1

TDD UL-DL Configurations.

| TDD UL-DL Configu-ration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The TDD UL-DL configurations in Table 1 provide 40% and 90% of DL subframes per frame to be DL subframes (and the remaining to be UL subframes). Despite this flexibility, a semi-static TDD UL-DL configuration that can be updated every 640 msec or less frequently by System Information (SI) signaling may not match well with short term data traffic conditions. For this reason, faster adaptation of a TDD UL-DL configuration is considered to improve system throughput especially for a low or moderate number of connected UEs. For example, when there is more DL traffic than UL traffic, the TDD UL-DL configuration can be adapted to include more DL subframes. Signaling for faster adaptation of a TDD UL-DL configuration can be provided by several means including a PDCCH, Medium Access Control (MAC) signaling, and Radio Resource Control (RRC) signaling.

An operating constraint in an adaptation of a TDD UL-DL configuration by means other than SI signaling is an existence of UEs that cannot be aware of such adaptation. Such UEs are referred to as conventional UEs. Since conventional UEs perform measurements in DL subframes using a respective CRS, such DL subframes cannot be changed to UL subframes or to special subframes by a faster adaptation of a TDD UL-DL configuration. However, an UL subframe can be changed to a DL subframe without impacting conventional UEs as a NodeB can ensure that such UEs do not transmit any signals in such UL subframes. In addition, an UL subframe common to all TDD UL-DL configurations should exist to enable a NodeB to possibly select this UL subframe as the only UL one. This UL subframe is subframe#2. Considering the above, Table 2 indicates the flexible subframes (denoted by 'F') for each TDD UL-DL configuration in Table 1.

TABLE 2

Flexible Transmission Time Intervals (TTIs) (F) for TDD UL-DL configurations

| TDD UL-DL Configu-ration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | F | F | D | F | F | F | F |
| 1 | 5 ms | D | S | U | F | D | D | F | F | F | D |

TABLE 2-continued

Flexible Transmission Time Intervals (TTIs) (F) for TDD UL-DL configurations

| TDD UL-DL Configu-ration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | F | F | D | D |
| 3 | 10 ms | D | S | U | F | F | D | D | D | D | D |
| 4 | 10 ms | D | S | U | F | D | D | D | D | D | D |
| 5 | 10 ms | D | S | U | D | D | D | D | D | D | D |
| 6 | 5 ms | D | S | U | F | F | D | F | F | F | D |

The D2D communication networks can support D2D discovery and D2D communication, or support D2D discovery only. D2D discovery can be that a D2D transmitter UE transmits D2D discovery signal, and other D2D receiver UEs receive the signal. For D2D discovery, it can support Type 2 communication where the resource used by a UE to transmit D2D discovery is scheduled by eNB, and Type 1 communication where a UE on its own selects resources from resource pools to transmit D2D discovery. For D2D communication, it can support Mode 1 communication where the resource used by a UE to transmit D2D control/data is exactly scheduled by eNB, and Mode 2 communication where a UE on its own selects resources from resource pools to transmit D2D control/data.

To support a first D2D UE in a first cell to receive a D2D signal transmitted by a D2D UE in a second cell, or a first D2D UE in a first cell to transmit a D2D signal to a D2D UE in a second cell, which is referred to as inter-cell D2D discovery and/or communication, is important in D2D communication network, especially for asynchronous network, where the cells in the network may not be synchronized. To support inter-cell D2D discovery and/or communication in asynchronous network, how the receiver could get the timing information so it can receive UE's signal across cells is crucial problem, especially for D2D communication networks which support D2D discovery and D2D communication, or D2D networks which support D2D discovery only, respectively. In addition, the resource pool which will be used by D2D communication plays an important role for the D2D communication to co-exist with the wide area network (WAN), i.e., the cellular network.

Therefore, there is a need to provide method for a receiver UE to receive D2D signal across cells in asynchronous network supporting D2D discovery and communication. Also, there is another need to provide method for a receiver UE to receive D2D signal across cells in asynchronous network supporting D2D discovery only. In addition, there is another need to configure a resource pool, with the consideration of FDD and TDD system, to ensure a reasonable co-existence with WAN.

Throughout the disclosure, 'sync' is an abbreviation of synchronization.

An eNB can transmit a legacy sync signal which can have a Primary Sync Signal (PSS) and Secondary Sync Signal (SSS). A first D2D UE can synchronize to an eNB, if eNB's sync signal can be received. The first D2D UE which is synchronized to an eNB can transmit a D2D Sync Signal (D2DSS) and Physical D2D Sync CHannel (PD2DSCH) on a hop with hop number value 2, and a second D2D UE which receives the D2DSS can get synchronized to it. The D2DSS can carry information of the sync preamble or sequence. The D2DSS can have a primary sync signal and a secondary sync signal. The D2DSS can also indicate whether the sync source (which transmits sync signal on hop with hop number value 1) is an eNB or not. The D2DSS can also indicate information related to the hop number on the hop which transmits a D2DSS. The PD2DSCH can carry important system information, where some information can be related to sync. For example, The PD2DSCH can carry some information related to hop number in addition to the information in the D2DSS. The second D2D UE can transmit the D2DSS and PD2DSCH on a hop with hop number value 3, and a third D2D UE which receives the D2DSS/PD2DSCH can get synchronized to it. It can be extended to arbitrary number of hops. There can be a maximum number of hops that a system can support, where the maximum number can be fixed or predefined.

A fourth D2D UE, if it cannot synchronize to any node which is eNB or a D2D UE which transmits the D2DSS/PD2DSCH indicating its sync source is eNB, it can become a D2D UE with an independent UE sync source. It can transmit a D2DSS/PD2DSCH on a hop with hop number value 1. The D2DSS can indicate whether the sync source is an independent UE sync source. A fifth D2D UE which receives the D2DSS/PD2DSCH can get synchronized to it. The fifth D2D UE can transmit the D2DSS and PD2DSCH on a hop with hop number value 2, and a sixth D2D UE which receives the D2DSS/PD2DSCH can get synchronized to it. These D2D connections can be extended to arbitrary number of hops.

Figure 5:
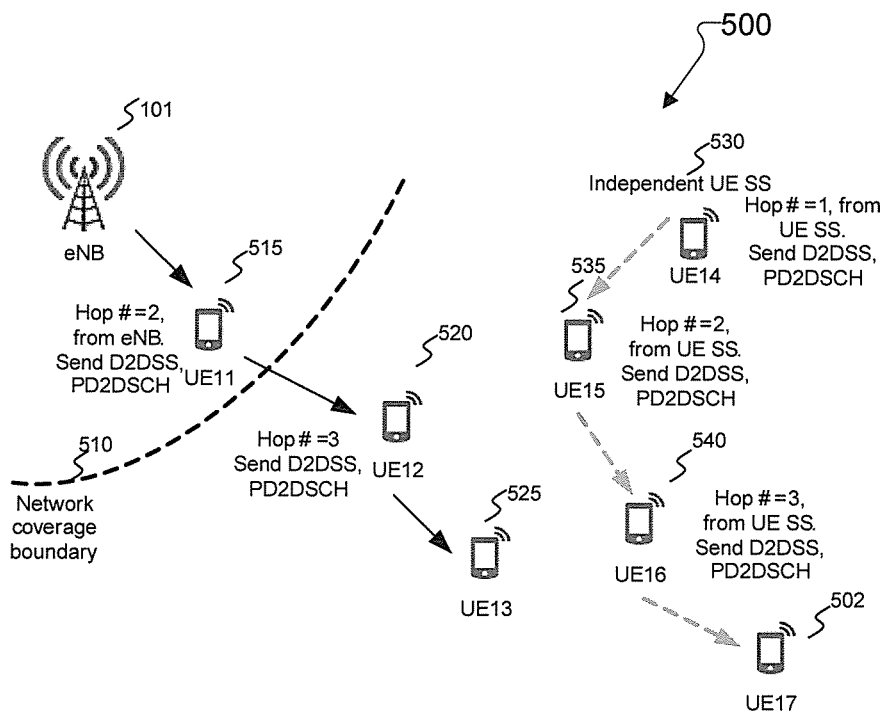
FIG. 5 illustrates a scenario for D2D sync establishment according to embodiments of the present disclosure.

FIG. 5 illustrates a scenario 500 for D2D sync establishment according to embodiments of the present disclosure. The embodiment shown in FIG. 5 is for illustration only. Other embodiments could be used without departing from the scope of the present disclosure.

Referring to FIG. 5, UE11 515 receives sync and gets synchronized with eNB 101 within network coverage boundary 510. UE11 transmits a D2DSS/PD2DSCH on a hop with hop number 2. UE12 520 receives a D2DSS/PD2DSCH from UE11 515, gets synchronized, and it transmits a D2DSS/PD2DSCH on a hop with hop number 3. UE13 525 receives a D2DSS/PD2DSCH from UE12 520 and gets synchronized. UE14 530 identifies itself as an independent sync source (SS) as it cannot receive any of the sync signal from eNB or UE11, 12, 13, so it transmits a D2DSS/PD2DSCH on a hop with hop number 1. UE15 535 receives D2DSS/PD2DSCH from UE14 530, gets synchronized, and it transmits a D2DSS/PD2DSCH on a hop with hop number 2. UE16 540 receives a D2DSS/PD2DSCH from UE15 535, gets synchronized, and it transmits a D2DSS/PD2DSCH on a hop with hop number 3. UE17 502 receives D2DSS/PD2DSCH from UE16 540 and gets synchronized.

If a first UE associated with a first cell which does not detect the sync signal of a second cell, needs to receive a D2D signal for discovery or for communication transmitted by a second UE associated the second cell, the first UE can obtain the timing of the second cell via other UEs associated in the second cell, or via the first cell that can get the timing of the second cell via backhaul or other method, such as a UE relaying.

How the first UE obtains the timing of the second cell via other UEs in the second cell can be depending on whether the network supports D2D discovery only, or both D2D discovery and communication. For a network supporting communications and discovery, the first UE can receive a timing from UEs associated with the second cell, which transmit a D2DSS for communications. For a network supporting discovery only, the first UE can receive a timing from UEs associated with the second cell, which can transmit a D2DSS at the beginning of the discovery resources within a discovery period.

Figure 6:
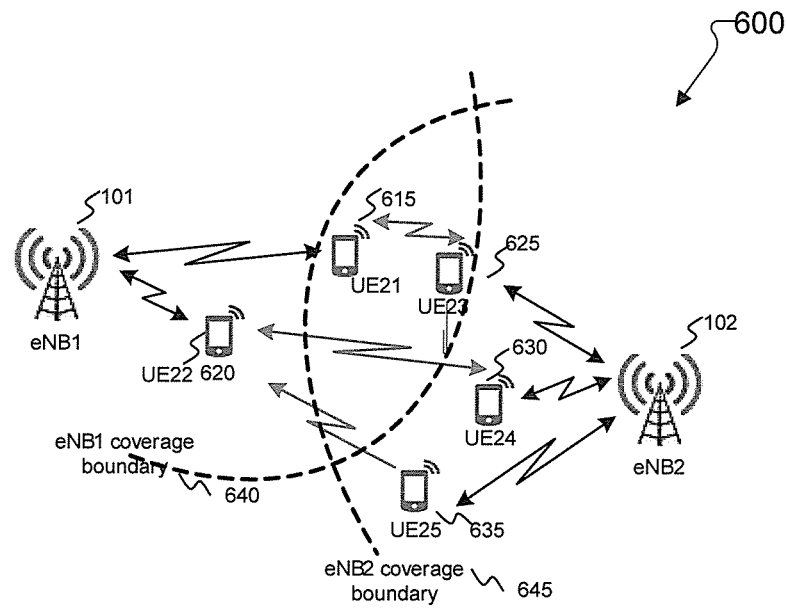
FIG. 6 illustrates an scenario for inter-cell D2D discovery or communications according to embodiments of the present disclosure.
Figure 25:
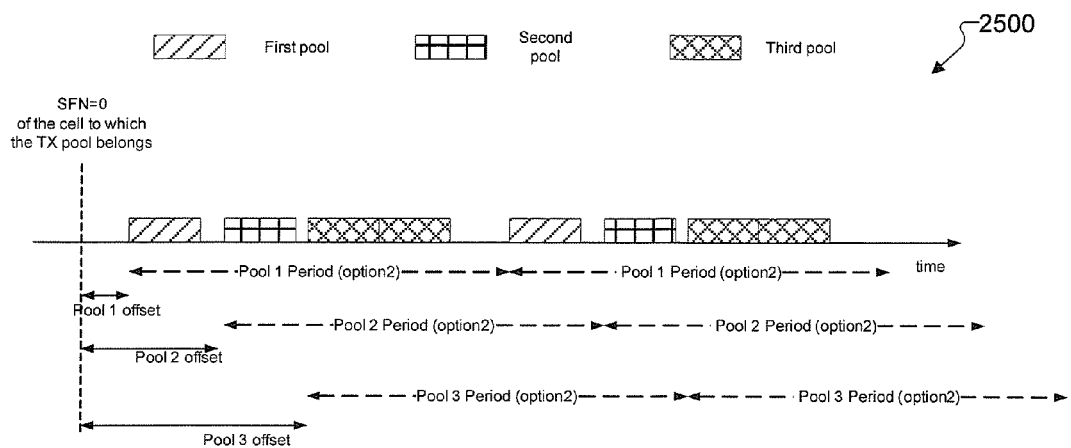
FIG. 25 illustrates another multiple resource pools configuration according to embodiments of the present disclosure.

FIG. 6 illustrates an example scenario 600 for inter-cell D2D discovery or communications. The embodiment shown in FIG. 25 is for illustration only. Other embodiments could be used without departing from the scope of the present disclosure.

Referring to FIG. 6, UE21 615 associates with eNB1 101 within network coverage boundary 640. UE1 can also detect the sync signal from eNB2 102. UE21 615 associates with eNB2 102 within network coverage boundary 645. UE23 625 can also detect the sync signal from eNB1 101. UE21 and UE23 can receive each other's D2D signal if any. UE22 620 associates with eNB1 101 within network coverage boundary 640. However, UE22 cannot detect the sync signal from eNB2 102. UE24 630, UE25 635 are associated with eNB2 102 within network coverage boundary 645. UE22 is supposed to receive D2D signal from UE24. UE22 can be provided with a RX resource pool for reception of a D2D signal transmitted by UEs associated with eNB2 102, but, as UE22 cannot receive the sync signal from eNB2 102, it does not know the timing of eNB2 102. For a network supporting communications and discovery, suppose UE2 can receive some timing from UEs (for example, UE24, UE25) associated with eNB2 102 which transmit a D2DSS (for communications). For a network supporting discovery only, some UEs (for example, UE24, UE25) supporting discovery which are associated with eNB2 102 can transmit a D2DSS in the first subframe of the discovery resources within a discovery period. Alternatively, UE22 can get timing of eNB2 102 from its serving cell in eNB1 101.

In some embodiments, an infrastructure node, such as eNB, can inform a UE of whether it supports D2D discovery only, or whether it supports both D2D discovery and communication. Such information can be carried, for example, in a system information block, or RRC message. It can also inform a UE of whether a neighboring cell supports D2D discovery only, or whether it supports both D2D discovery and communication, and the information can be jointly with the cell's identifier such as a carrier index and a Physical Cell ID (PCID) or the preamble in a sync signal. Such information can be carried, for example, in a system information block, or RRC message.

For network supporting D2D discovery only, an infrastructure node, such as an eNB, can inform a UE of a possible D2DSS sequence. For network supporting D2D communication, an infrastructure node, such as an eNB, can inform a UE of whether Mode 2 is supported, and Mode 1 & Mode 2 is supported.

As an extension, if the network only supports discovery, the network or eNB can implicitly signal to the UE whether the UE transmitting a discovery signal should also transmit a D2DSS, via whether a D2DSS sequence is configured or not in a signaling to a UE or a group of UEs which support discovery. If a UE which support D2D discovery receives a signaling including a configured D2DSS sequence, then the UE transmits a D2DSS, otherwise, it does not transmit a D2DSS.

The eNB indication for whether the eNB supports D2D discovery only, or whether the eNB supports both D2D discovery and communication, can be alternatively, the indication of whether the eNB supports UE transmitting a D2DSS for a UE supporting discovery only, or whether the eNB does not support UE transmitting a D2DSS for a UE supporting discovery only. Or alternatively, The eNB indication inform of whether a UE needs to receive discovery to monitor a D2DSS at the beginning of the discovery resource or before the discovery period (for example, the first subframe of the discovery resource, or some subframes before the discovery period), or a UE does not need to receive discovery to monitor a D2DSS at the beginning or before the discovery resource.

Table 3 below illustrates a portion of the fields in the message for the above purpose. If the message is for the serving cell itself, the carrier index and the preamble can be omitted. If the message is for a neighboring cell, the carrier index and the preamble can be included. In the table 3 below, alternatively, all the 'support for discovery only' can be replaced by 'supports UE transmitting a D2DSS for a UE supporting discovery only', and 'support for both discovery and communication' can be replaced by 'not support UE transmitting a D2DSS for a UE supporting discovery only'. Alternatively, all the 'support for discovery only' can be replaced by 'needs UE to receive discovery to monitor a D2DSS at the beginning of or before the discovery resource', and 'support for both discovery and communication' can be replaced by 'does not need UE to receive discovery to monitor a D2DSS at the beginning of or before the discovery resource'.

TABLE 3

| Information Fields In Message | |
|---|---|
| | Information |
| ... | ... |
| Information of a cell { | |
| Carrier index | Carrier index of the node |
| Preamble | Preamble transmitted by the cell |
| Support for communications and/or discovery | '0': support for discovery only<br>'1': support for both discovery and communications<br>Alternatively,<br>'00': not support discovery or communications for D2D<br>'01': support only discovery<br>'10': support only communications<br>'11': support both discovery and communications<br>Alternatively,<br>A first bit,<br>'0': not support for discovery<br>'1': support for discovery<br>A second bit,<br>'0': not support for communication<br>'1': support for communication<br>Further, for communication (the second bit being '1'), '0' support Mode2 communication, T Mode1&Mode2 communication. For discovery only (the first bit being '1' and the second bit being '0', include 'D2DSS sequence configured for discovery'.<br>Alternatively,<br>Including 'D2DSS sequence configured for discovery': support only for discovery<br>Not including 'D2DSS sequence configured for discovery': '01' support Mode2 communication, '10' Mode1&Mode2 communication, '00' does not support communication, '11' reserved |
| } | |
| ... | ... |

In some embodiments, for a D2D receiver UE to receive D2D signal from a UE which is associated with a cell or a network, the receiver UE can have a respective operation with regard to whether the cell or the network supports D2D discovery only, or the cell or the network supports both D2D discovery and communication. Alternatively, the receiver UE can have a respective operation with regard to whether the cell or network supports UE transmitting a D2DSS for a UE supporting discovery only, or whether it does not support UE transmitting a D2DSS for a UE supporting discovery only. Or alternatively, the receiver UE can have a respective operation with regard to whether the cell or network needs UE to receive discovery to monitor a D2DSS at the beginning of or before the discovery resource (for example, the first subframe of the discovery resource), or it does not need a UE to receive discovery to monitor a D2DSS at the beginning of or before the discovery resource. Or alternatively, the receiver UE can have a respective operation with regard to whether the cell or network configures a reception resource pool for the UE to monitor a D2D signal from other UEs associated with a cell where the resource pool can be configured together with a respective D2DSS sequence, or whether the cell or network configures a reception resource pool for the UE to monitor a D2D signal from other UEs associated with a cell where the resource pool is not configured together with a respective D2DSS sequence.

A D2D receiver UE can be provided with a RX pool to for it to monitor the discovery signal. Different RX pools can be for a discovery signal from UEs in different cells. Each RX pool can have an identifier of the cell to which the transmitting UEs are associated. The identifier of the cell can include a carrier index, and a Physical Cell ID (PCID) which is conveyed by the sync signal of the cell. The information related to RX pools can be provided to a D2D receiver UE by UE-common signaling or UE-dedicated signaling, such as a system information block, or a dedicated RRC message. Similarly, RX pools for communication purpose can also be provided to the UE. In certain embodiment, the RX pool can be the same as a TX pool for a cell, if the pool is based on each cell, i.e., RX or TX pool is cell specific. In certain embodiment, an RX pool can be a union of multiple TX pools of multiple cells, where a TX pool can be cell specific, and RX pool can be UE specific. In certain embodiment, the RX pool, or the TX pool, can be UE specific. The RX or TX pool can be for each of the neighboring cells of a UE, as well as the serving cell of a UE.

For a D2D receiver UE to receive a D2D signal from a UE which is associated with a cell or a network supporting both D2D discovery and communication, (or alternatively, from a UE which is associated with a cell or a network not supporting a D2DSS transmission by a UE supporting discovery only, or alternatively, from a UE which is associated with a cell or a network which does not need UE to receive discovery to monitor a D2DSS at the beginning of or before the discovery resource, or alternatively, from a UE which is associated with a cell or a network where the reception resource pool for a UE to monitor the signal from the UEs in a respective cell is not configured together with a respective D2DSS sequence), the receiver UE can have information of its serving cell, such as the sync signal, and so on. The receiver UE can also have information of a neighboring cell, for example, an identifier of the neighboring cell carried in the signaling for RX pool configuration, or an identifier of the neighboring cell carried in a list of neighboring cell. The receiver UE can try to receive sync of a first cell (the serving cell or neighboring cell), acquire the timing of the first cell, and obtain cell identifier carried by the sync. Based on the cell identifier, the receiver UE can determine the RX pool, for example, by looking it up if multiple cell identifiers are provided together with respective RX pools. The UE can then monitor a discovery or communication signal transmitted by UE(s) who use the first cell's resource pool to a transmit D2D signal. For a second cell, the UE can do similar operation to monitor a discovery or communication signal transmitted by UE(s) who use a second cell's resource pool to transmit a D2D signal.

Figure 7:
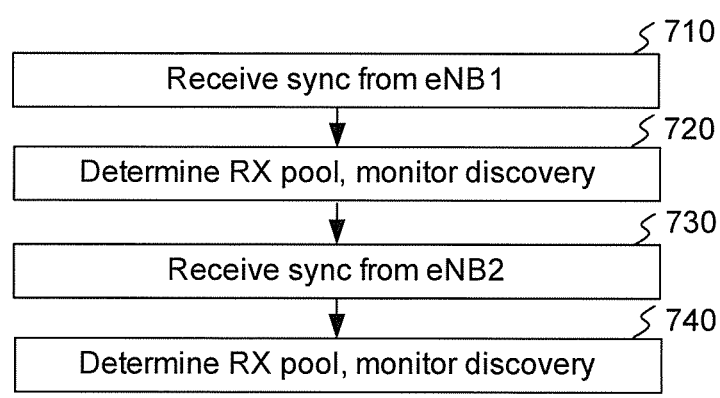
FIG. 7 illustrates a flowchart for receiver UE's operations for inter-cell D2D discovery.

FIG. 7 illustrates a flowchart 700 for receiver UE's operations for inter-cell D2D discovery. This flowchart can also be applicable for D2D communication. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a UE, eNB or other entity.

In FIG. 7, a UE is provided with D2D discovery RX pool for eNB1 and D2D discovery RX pool for eNB2. The UE receives sync from eNB1 and obtains timing of eNB1 in step 710. The UE determines a RX pool that can be based on the identifier of eNB1 (conveyed by sync of eNB1), and monitors discovery in step 720. The UE can further receive sync from eNB2 102 obtains timing of eNB2. The UE determines a RX pool with respect to eNB2, and monitors discovery in step 740.

If a D2D receiver UE receives information of a neighboring cell (for example, an identifier of the neighboring cell carried in the signaling for RX pool configuration, or an identifier of the neighboring cell carried in a list of neighboring cell), and the UE tries to detect sync signal from the neighboring cell, but cannot detect it, the UE can try to detect a sync signal transmitted by another UE(s). There can be certain criteria for the UE to determine that the UE does not a detect sync signal from a cell. The criteria can be, for example, that during a cell search time duration, the UE does not detect the PCID of the cell. Other criteria can also apply. If the D2D UE receiver can detect a D2D sync signal (D2DSS) from a UE associated with a certain cell, the D2D receiver UE can derive a timing of the certain cell.

The D2DSS for communication can use a D2DSS sequence that can be UE specific, or cell specific, or group specific (for example, the UE in coverage can have a cell specific D2DSS sequence, while for the UE out of coverage can use UE specific sequence; or the UE that derives a TX from eNB can use a cell specific D2DSS sequence, while the UE that does not derive a TX timing from eNB can uses UE specific sequence; or the UE that derives TX from eNB can use a cell specific D2DSS sequence, while the UE that derives a timing from a UE sync source uses the same D2DSS sequence as the sync source, and uses a UE specific sequence, and a UE that is an independent sync source can use a UE specific D2DSS sequence; or any UE can use a UE specific sequence. D2DSS for discovery can use a cell specific sequence. For in coverage UE uses cell specific sequence of D2DSS for the communication case, the D2DSS sequence can be the same as the one to be used for discovery.

A UE that transmits a D2DSS and the UE can indicate information of the cell from which the UE derives sync. Such information can be carried, for example, in a PD2DSCH. After the D2D receiver UE detects a D2DSS, it can further detect a PD2DSCH transmitted by the UE who transmitted a D2DSS, and the receiver UE can obtain the information of the cell from which the UE (who transmits a D2DSS) derives timing. The timing derivation from a cell can be after one or multiple hops from the cell or the eNB, as long as the timing is derived from the cell or the eNB. Based on the information of the cell indicated, the receiver UE can then determine the discovery resource pool of the respective cell. And then the receiver UE can monitor the discovery signal transmitted by UEs associated with the cell. The UEs which transmit a D2DSS can be the same or different from the UEs which transmit a discovery signal. For example, the D2DSS can be transmitted by a UE which can need D2D communication, but not for discovery. Table 4 below illustrates a portion of information fields in a PD2DSCH.

TABLE 4

| | Size (bits) | Information |
|---|---|---|
| ... | ... | ... |
| Information of a cell the UE derives sync from { Carrier index Preamble, or PCID } | | Carrier index of the cell Preamble in a sync signal transmitted by the cell, or PCID |
| ... | ... | ... |

If a D2DSS sequence is assigned to each cell, where the UEs in a respective cell should use the assigned D2DSS sequence, where the D2DSS sequence can be used for inter-cell D2D discovery, or inter-cell D2D communication, or both, the D2DSS sequence can be carried in PD2DSCH, or carried in other signaling together with the resource pool. If different D2DSS sequences are used to a group of cells which are neighbors to each other, D2DSS sequences can be used to differentiate or identify the cells, instead of a PCID. For example, in Table 4, or in Table 7 described below, a D2DSS sequence can be used instead of a PCID or preamble. In some cases, both D2DSS sequence and PCID (or preamble) can be signaled. In some cases, a D2DSS sequence used for inter-cell D2D discovery, or inter-cell D2D communication, can derive from a PCID. For example, a D2DSS sequence which has a total M bits can have N bits from a PCID, where (M-N) bits to indicate it is the D2DSS sequence used for inter-cell D2D discovery, or inter-cell D2D communication (for example, M=9, N=7, and a reserved 2 bits (for example, '11') to indicate it is for inter-cell D2D discovery (or communication if applicable), and 7-bit from a PCID (for example, 7 least significant bit (LSB) of PCID) can be added after the reserved 2-bit, to form the D2DSS sequence).

Figure 8:
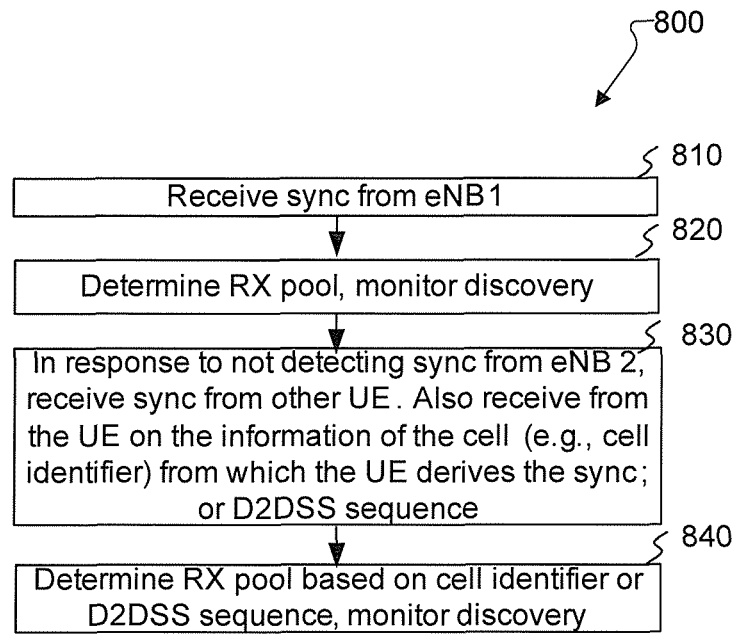
FIG. 8 illustrates a flowchart for the receiver UE's operations for inter-cell D2D discovery according to embodiments of the present disclosure.

FIG. 8 illustrates a flowchart 800 for the receiver UE's operations for inter-cell D2D discovery. This flowchart can also be applicable for the D2D communication. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuity in, for example, a UE, eNB or other entity.

Referring to FIG. 8, a D2D UE is provided with D2D discovery RX pool for eNB1 and D2D discovery RX pool for eNB2 102. The D2D UE receives sync from eNB1 and obtains timing of eNB1 in step 810. The D2D UE determines a RX pool that can be based on the identifier of eNB1 (conveyed by sync of eNB1), and monitors discovery in step 820. The UE does not detect sync from eNB2 102. The UE tries to detect a sync signal from other UEs. The UE receives a sync signal from another UE, and further receives from the other UE (for example, UE's transmitted PD2DSCH) on the information of the cell from which the UE derives the sync signal in step 830. And the UE finds out the carrier index and the PCID happen to be the ones for eNB2. Then the UE determines a RX pool with respect to eNB2, and uses the timing derived from the other UE which transmits the D2DSS and indicates the cell identifier of eNB2 in PD2DSCH. The UE monitors discovery as shown in step 840. Or alternatively, the UE detects a D2DSS from the other UE, and the UE determines a RX pool based on the D2DSS sequence to monitor discovery. Similar cases can be applied for the inter-cell D2D communication.

Alternatively, the receiver UE can get a signal (for example, a RRC signal, a system information block, and the like) from its serving cell, and the serving cell can tell a UE the RX pool to monitor discovery, where the RX pool can already be customized to the UE's neighbor (NBR) cells (for example, based on NBR cells of the UE's serving cell, with some additional timing related information, such as the timing offset with the reference of the serving cell). The NBR cell timing offset relative to the serving cell can be obtained by the serving cell, for example, via backhaul, or via relaying UEs, and so on.

For a D2D receiver UE to receive a D2D signal from a UE associated with a cell or a network supporting only D2D discovery (or alternatively, from a UE associated with a cell or a network supporting D2DSS transmission by a UE supporting discovery only, or alternatively, from a UE associated with a cell or a network which need UE to receive discovery to monitor a D2DSS at the beginning of or before the discovery resource, or alternatively, from a UE associated with a cell or a network where the reception resource pool for a UE to monitor the signal from the UEs in a respective cell is configured together with a respective D2DSS sequence), the receiver UE can have information of its serving cell, such as the sync signal, and so the like.

The receiver UE can also have information of a neighboring cell, for example, an identifier of the neighboring cell carried in the signaling for RX pool configuration, or an identifier of the neighboring cell carried in a list of neighboring cell. The receiver UE can try to receive a sync of a cell (the serving cell or neighboring cell), acquire the timing of the first cell, and obtain cell identifier carried by the sync.

Based on the cell identifier, the receiver UE can determine the RX pool, for example, by looking it up if each cell identifiers is provided together with respective RX pool. The UE can then monitor a discovery signal transmitted by UE(s) who use the cell's resource pool to transmit a D2D signal. The operation can be similar to the one illustrated in FIG. 7.

The resource pool of discovery can be linked to a D2DSS sequence that UEs supporting discovery can transmit at the beginning of the discovery within a period or before the discovery period. This can be for the network supporting D2D discovery only, not D2D communications.

If the receiver UE tries to detect a sync signal from the neighboring cell, but fails to detect it, the D2D UE can try to detect a sync signal transmitted by other UE(s) through the following operations. For a network supporting discovery only, the UEs associated with a cell can be configured with a cell specific D2DSS sequence, and transmits the D2DSS with the configured sequence at the beginning (for example, in the first subframe) of the discovery resources within a discovery period or before the period. The D2DSS sequence can be configured per cell identifier, for example, for each carrier index and PCID of a cell, there can be one D2DSS sequence that the discovery UEs within the cell can use to transmit a D2DSS.

The D2DSS sequence can be carried together with the discovery resource pool, with respect to each cell. The D2DSS sequence with respect to the serving cell can be the one for transmitting UEs and the receiver UEs. The D2DSS sequence with respect to the NBR cell can be the one for the receiver UE to monitor. The receiver UE can try to detect the respective D2DSS transmitted by UEs for each of the NBR cell, if the D2DSS sequence is configured with respect to the RX resource pool.

If the D2DSS is detected, the receiver UE then can figure out the corresponding cell for the detected D2DSS, and determine the RX resource pool. The receiver UE can monitor the discovery signal based on the RX resource pool and the timing obtained from the D2DSS which is corresponding to the RX resource pool.

If the D2DSS sequence transmitted by the UE can be different from the PCID of the cell to which the UE is associated with, the D2DSS sequence can be configured and signaled to the receiver UE. If the D2DSS sequence transmitted by the UE can be the same as the PCID of the cell to which the UE is associated with, then the D2DSS sequence may not need to be signaled, as it can be fixed to be or it can be by default to be the PCID of the cell to which the UE is associated with, then there can need to be a signaling to the receiver UE whether the receiver UE should monitor for the PCID transmitted by UE, or the receiver UE does not need to monitor for the PCID transmitted by a UE, so the UE can accordingly simplify its operation.

If the receiver UE detects a D2DSS, and the receiver UE cannot find the corresponding cell for the detected D2DSS sequence, or the detected D2DSS sequence is not any of the configured D2DSS sequences with respect to the RX pools of the cells, the UE can declare an error of the D2DSS detection.

If the receiver UE can also detect a D2DSS sequence transmitted for communication purpose, then if the receiver UE detects a D2DSS and does not find the corresponding cell for the detected D2DSS sequence, or the detected D2DSS sequence is not any of the configured D2DSS sequences with respect to the RX pools of the cells, the UE may not declare an error of the D2DSS detection. Rather, the receiver UE declares that it detects a D2DSS for communication purpose. The receiver UE can further detect the PD2DSCH to find out the PCID, so then can find out the respective resource pool.

Figure 9:
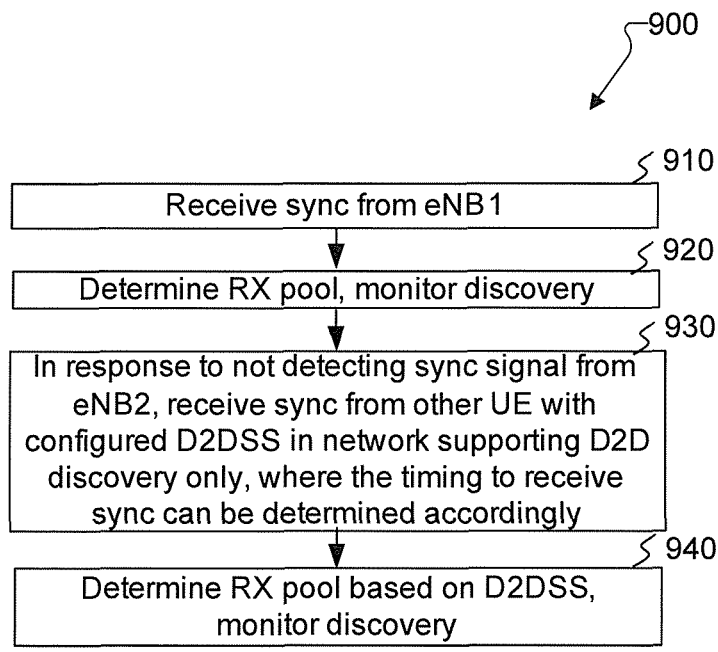
FIG. 9 illustrates a flowchart for the receiver UE's operations for inter-cell D2D discovery according to embodiments of the present disclosure.

FIG. 9 illustrates a flowchart 900 for the receiver UE's operations for inter-cell D2D discovery. This flowchart can be applicable for inter-cell D2D communication. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuity in, for example, a UE, eNB or other entity.

Referring to FIG. 9, a D2D UE is provided with a D2D discovery RX pool for eNB1 and a D2D discovery RX pool for eNB2. The D2D UE receives a sync from eNB1 and obtains a timing of eNB1 in step 910. The D2D UE determines RX pool which can be based on the identifier of eNB1 (conveyed by sync of eNB1), and monitors discovery in step 920. The UE that does not detect sync from eNB2 tries to detect sync from other UEs. The UE then tries to detect configured D2DSS for eNB2 supporting D2D discovery only. The UE receives and detects a sync signal from other UE, where the sync signal has the D2DSS sequence for eNB2. The timing for the UE to receive D2DSS can be determined according to the network supporting D2D discovery only 630, as shown in step 930. Then, the UE determines RX pool with respect to eNB2, and use the timing derived from the other UE which transmits the D2DSS and which indicates the cell identifier of eNB2 in PD2DSCH, and the UE monitors discovery as shown in step 940.

Alternatively, the D2D receiver UE may use the similar operations as previously described for the network supporting discovery and communication, such as the ones illustrated in FIG. 8, especially if the D2DSS sequence for a cell supporting discovery only is not cell specific, rather, it can be multiple different D2DSS sequences.

A receiver UE can determine respective method to use, according to whether the cell supports discovery only, or support both communication and discovery. The UE can be provided with a list of NBR cells, and it can check whether those cells support discovery only, or support both communication/discovery. It can also check whether it can detect the sync of cell, and if so, it does not need to detect additional sync from the UE for inter-cell D2D discovery/communication case.

Figure 10:
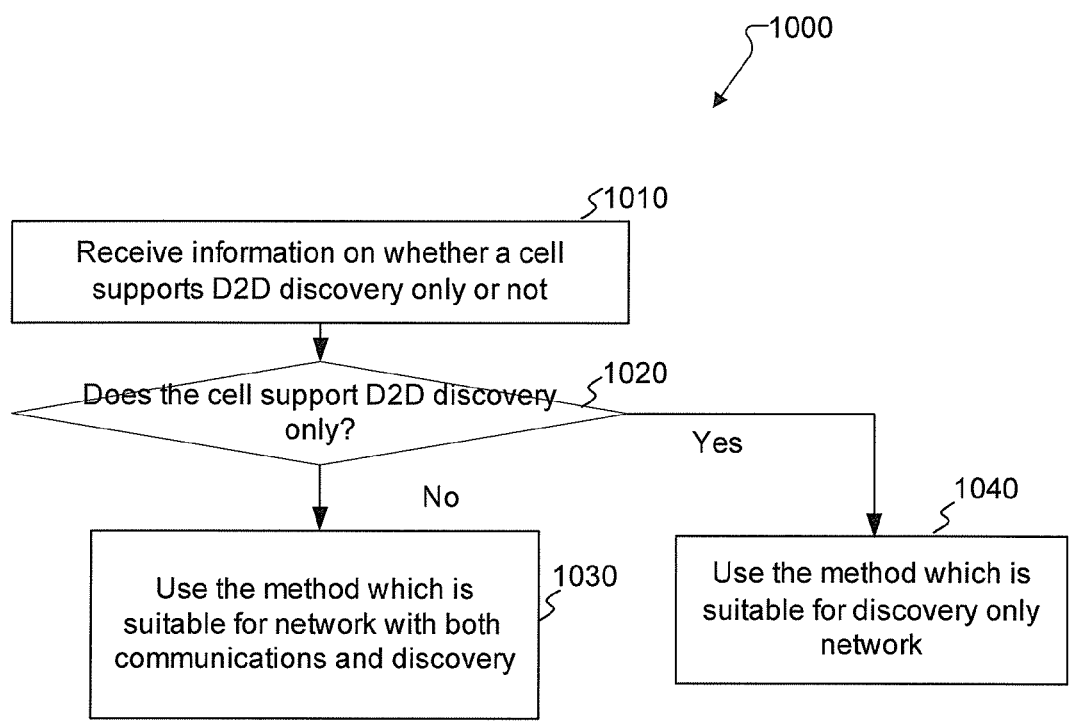
FIG. 10 illustrates a flowchart for the receiver UE's operations for inter-cell D2D discovery according to embodiments of the present disclosure.

FIG. 10 illustrates a flowchart 1000 for the receiver UE's operations for inter-cell D2D discovery. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a UE, eNB or other entity.

Referring to FIG. 10, a UE receives information on whether a cell supports D2D discovery only or not in step 1010. The UE determines whether a cell supports D2D discovery only in step 1020. If the cell does not support D2D discovery only, in other words, if the cell supports D2D discovery and communication, the UE can use the method which is suitable for network supporting both communication and discovery in step 1030, such as the embodiment illustrated in FIG. 8. If the cell supports D2D discovery only, the UE can use the method which is suitable for network supporting discovery only in step 1040, such as the embodiment illustrated in FIG. 9 in a case where the D2DSS sequence which can be cell specific is only used for discovery, not for communication (for example, if the communication UE uses a UE specific D2DSS sequence). If the D2DSS sequence which is cell specific can be used for both discovery and communication, then either the embodiment in FIG. 8 or the embodiment FIG. 9 can work.

Alternatively, the step 1010 can be replaced by that the UE receives information on whether a cell or a network supports the D2DSS transmission by a UE supporting discovery only, and the step 1020 can be replaced by that whether the cell supports D2D transmission by a UE supporting discovery only'.

Alternatively, the step 1010 can be replaced by that the UE receives information on whether a cell or a network need a UE to receive discovery to monitor a D2DSS at the beginning of or before the discovery resource for a respective cell, and the step 1020 can be replaced by that whether the cell needs UE to receive discovery to monitor a D2DSS at the beginning of or before the discovery resource for a respective cell.

Alternatively, the step 1010 can be replaced by that a UE receives information on whether a cell or a network configures (together with a respective D2DSS sequence) the reception resource pool for a UE to monitor the signal from the UEs in a respective cell. The step 1020 can be replaced by that does the cell configure (together with a respective D2DSS sequence) the reception resource pool for a UE to monitor the signal from the UEs in a respective cell. The step 1030 can be accordingly changed for each of the alternative options mentioned above: Use the method which is suitable for network supporting both D2D discovery and communication, (or alternatively, for network not supporting the D2DSS transmission by a UE supporting discovery only, or alternatively, for network which does not need UE to receive discovery to monitor a D2DSS at the beginning of or before the discovery resource, or alternatively, for a network where the reception resource pool for a UE to monitor the signal from the UEs in a respective cell is not configured together with a respective D2DSS sequence). The step 1040 can be accordingly changed for each of the alternative options mentioned above: Use the method which is suitable for network supporting discovery only, (or alternatively, network supporting the D2DSS transmission by a UE supporting discovery only, or alternatively, network which need UE to receive discovery to monitor a D2DSS at the beginning of or before the discovery resource, or alternatively, network where the reception resource pool for a UE to monitor the signal from the UEs in the cell is configured together with a respective D2DSS sequence).

A receiver UE can use the following operations. A receiver UE is provided with RX pool per PCID and carrier index of a cell. The receiver UE attempts to search for NBR cell's sync based on the PCID can carrier index. If NBR cell's sync can be found or detected, it uses the timing based on the NBR cell's sync to decode the D2D signal from UEs (who derives its timing from the NBR cell). If NBR cell's sync cannot be found, and if a D2DSS sequence is configured for a NBR cell (SIB, or dedicated signal), the UE will look for a D2DSS transmitted by UE. If such D2DSS is found for the respective NBR cell, the D2D receiver UE uses the timing based on the D2DSS from the UE to decode the D2D discovery signal from UEs (who derives its timing from the respective NBR cell). If such a D2DSS from UE is not found, the UE can use the serving cell timing or it can skip monitoring the discovery for the respective NBR cell. If the NBR cell's sync is not found, and if the D2DSS sequence is not configured (assume the D2DSS sequence configuration imply the D2DSS transmitted by some UEs in the respective cell), the UE can use the serving cell timing or can skip monitoring the discovery for the respective NBR cell. (If the D2DSS sequence is not configured means that the D2DSS sequence is the same as the PCID of the cell, then the receiver UE can be signaled with indication of whether the D2DSS is transmitted by some UEs in the respective NBR cell. If the signal indicates that a D2DSS is transmitted by some UEs in the respective NBR cell, the UE needs to attempt to decode the D2DSS transmitted by UE. If the signal indicates that D2DSS is not transmitted by UEs in the respective NBR cell, the UE does not need to attempt to decode the D2DSS transmitted by UE, and the UE can use the serving cell timing or can skip monitoring the discovery for the respective NBR cell.)

If the signaling to configure a resource pool is UE common, some UEs can receive a PCID, some UEs may not detect a PCID and they need to look for a D2DSS, so the signaling can include both PCID and D2DSS sequence. If the signalling is UE dedicated, if the eNB knows the UE can detect a PCID of a neighbor base station (for example, after UE's reporting), the eNB can send a PCID and respective resource pool, and a D2DSS sequence can be omitted. If the eNB does not know whether the UE would detect a PCID of a neighbor base station, it can need to provide both PCID and D2DSS sequence in the signaling.

In some embodiments, a network or an eNB can implicitly signal to the UE whether the UE transmitting a discovery signal should also transmit a D2DSS, via whether a D2DSS sequence is configured or not in a signaling to a UE or a group of UEs which support discovery. If a UE which support D2D discovery receives a signaling including a configured D2DSS sequence, then the UE transmits a D2DSS, otherwise, it does not transmit a D2DSS.

Within a discovery period, out-of-coverage UEs transmitting discovery signals can transmit a D2DSS in the first sub-frame of the transmission pool. The configuration of the D2DSS sequence that out-of-coverage UEs transmit can be included in a PD2DSCH.

An out-of-coverage UE can determine whether it transmit a D2DSS in the first sub-frame of the transmission pool or not, based on certain conditions, which can be, for example, configured. One of the conditions can be, for example, a UE can transmit a D2DSS in the first sub-frame of the transmission pool if the received signal strength of all received D2DSS(s) by the UE are below Th_D2DSS_Discovery dBm, where Th_ D2DSS_Discovery is a threshold which can be configurable.

In some embodiments, the resource pool for discovery, or for SA, or for data, can be different depending on whether the system is TDD or FDD.

For a TDD system, the resource pool for discovery, or for SA, or for data can be configured based on available UL resources, which can be depending on the TDD UL-DL configuration. The counting of some parameters of the resource pool configuration can be based on UL subframes. Alternatively, the counting of some parameters can be based on all the subframes, regardless of whether the subframe is DL or UL.

There can be an indicator on whether the configuration of the resource pool is for TDD or for FDD.

For a TDD system, the UL resources can be based on the TDD UL-DL configuration carried in SIB. Or, the UL resources can be based on an UL reference configuration.

For a TDD system, for example, the resource pool for discovery will consist of a period, a window for UL resources used for discovery during the period, and for each frame a bit map of which UL subframes are used for discovery. The bitmap can be of 8-bit, not including subframes #0, and 5 as they are always DL. An alternative is that the bitmap length can be depending on a TDD UL-DL configuration, where the bitmap length can be the same as the number of UL subframes within a frame with respect to a respective TDD UL-DL configuration.

The SFN of NBR cell can be provided as the offset relative to the SFN of serving cell. The D2D receiver UE can derive the SFN of the NBR cell based on the serving cell and the offset.

Tables 5 and 6 below illustrate example resource pool configurations. The FDD resource pool configuration includes information of a starting point (for example, starting frame, with or without a starting offset subframe), a duration of a window for bitmap (the duration can be for example, number of frames), bitmap of subframes within the duration of the window. The FDD resource pool configuration can be the same as TDD resource pool configuration, with the exceptions that u=10, and there is no need for TDD UL-DL configuration field. Table 5 illustrates that for TDD system, a bitmap can be repeated for each of m frame within the duration of a window, while Table 6 illustrates that for TDD system, a bitmap with length of u*y is provided, for more flexibility.

TABLE 5

Resource Pool Configuration

| | Size (bits) | Information |
|---|---|---|
| ... | ... | ... |
| Period of resource pool | | Period P. Number of frames |
| TDD or FDD | 1 | |
| If FDD { | | If it is FDD |
| FDD resource pool configuration | | FDD resource pool |
| } If TDD { | | |
| TDD UL-DL configuration | 3 | If it is TDD |
| Duration of a window | Ceiling(log$_2$(M)) | The length of a window (m frames) which has discovery resource (a fraction of the discovery period. There are in total M options for the value. |
| Bitmap of UL subframes to be used within a frame | u | It can be variable size depending on TDD UL-DL reference configuration. u = number of UL subframes within a frame, for a TDD UL-DL configuration. As an alternative, u can be fixed to be 8 |
| Starting frame within a period | Ceiling(log$_2$(P)) | SFN of starting frame, or D2D frame number (for out-of-coverage), relative to the starting point of each period |
| Starting offset subframe } | Ceiling(log$_2$(u)) | Indicate the offset of subframe, within the starting frame |
| ... | ... | ... |

TABLE 6

Resource Pool Configuration

| | Size (bits) | Information |
|---|---|---|
| ... | ... | ... |
| Period of resource pool | | Period P. Number of frames |
| TDD or FDD | 1 | |
| If FDD { | | If it is FDD |
| FDD resource pool configuration | | FDD resource pool |
| } If TDD { | | |
| TDD UL-reference configuration | 3 | If it is TDD |
| Duration of a window | Ceiling(log$_2$(M)) | The length of a window (m frames) which has discovery resource (a fraction of the discovery period. There are in total M options for the value. |

TABLE 6-continued

Resource Pool Configuration

| Size (bits) | Information |
|---|---|
| Bitmap window length in the unit of frames | Ceiling(log$_2$(Y)) | The length of a bitmap window (y frames) which will have bitmap. There are in total Y options for the value. Within m frames, the bitmap can be repeated (m/y) times |
| Bitmap of UL subframes to be used within y frames | u*y | It can be variable size depending on TDD UL-DL reference configuration. u = number of UL subframes within a frame, for a TDD UL-DL configuration. As an alternative, u can be fixed to be 8 |
| Starting frame within a period | Ceiling(log$_2$(P)) | SFN of starting frame, or D2D frame number (for out-of-coverage) |
| Starting offset subframe } | Ceiling(log$_2$(u)) | Indicate the offset of subframe, within the starting frame |
| . . . | . . . | . . . |

For a serving cell, the field of TDD or FDD may not be needed, as the UE can detect it from a sync signal of the serving cell. For a NBR cell, the field of TDD or FDD can be needed considering partial coverage or out of coverage UEs which can need to get relayed information of the cell. For PD2DSCH signaling, it can be needed for each cell.

The starting frame field can be the index of frame (0, 1, . . . , P−1) within a period P (frames). The starting point of the period can be the frame with a frame number (a SFN or a D2D frame number) n, satisfying, n modulo P=Offset_starting_period, where P is period of resource pool. Offset_starting_period can be a default value 0, or other values.

The offset for the starting offset subframe, can be the relative offset within the starting frame. It can be counted based on subframe index, regardless of UL or DL for TDD, or it can be counted based on only the UL subframes.

As an alternative, the period of resource pool P can be in the unit of number of subframes. The starting point of the period can be the subframe x within a frame with frame number (SFN or D2D frame number) n, satisfying (n*10+x) modulo P=Offset_starting_period, where Offset_starting_period can be in the unit of total number of subframes which indicates the starting of the period with respect to the first subframe in a frame with SFN=0. Offset_starting_period can be a default value 0, or other values, which can be configured, preconfigured, signaled, etc.

In the tables, ceiling(x) function gives the smallest integer no less than x.

In Table 5 and Table 6, the bitmap window length, or the bitmap span, can be depending on the TDD UL-DL configuration. If there is a one-to-one mapping between the TDD UL-DL configuration and the bitmap window length, i.e., if there is only one value for the bitmap window length for each of the TDD UL-DL configuration, then, the bitmap window length can be omitted in the signaling, and the UE can have a preconfigured bitmap window length according to the TDD UL-DL configuration. Once the UE obtains the TDD UL-DL configuration, it can figure out the bitmap window length by looking up the TDD UL-DL configuration and the preconfigured bitmap window length. In the tables, the bitmap window length is in the unit of frames, but alternatively, it can also be in the unit of subframes.

The resource pool configuration can include a bitmap, where each bit of the bitmap can indicate whether a respective subframe is used for or can be used as D2D resource. The bitmap can be repeated. The bitmap length can take into account the HARQ processes. The bitmap referred subframes, i.e., the subframes that he bitmap is pointing to, can be different for TDD and FDD case. If it is TDD, each bit of the bitmap indicates whether a subframe (for example, excluding subframe#0, subframe#5 in each frame) is used for as D2D resource, if TDD UL-DL configuration is not included. If certain special subframes may not be used for D2D, where the special subframe consists of DL symbols, a gap, and UL symbols, the bitmap can also exclude the special subframes. For example, the bitmap can exclude subframe #0, #1, #5, and #6. If TDD UL-reference or TDD UL-DL configuration is not included, each bit of the bitmap indicates whether a subframe (only including the UL subframes as per the TDD UL-reference or TDD UL-DL configuration) is used for as D2D resource. If it is FDD, each bit of the bit map indicates whether a subframe (including all subframes) is used for as D2D resource. There can be an option of indicating for the TDD case, which subframes are excluded from the bitmap, for example, a configuration of 1-bit can tell whether the exclusion is subframe#0, 5 or the exclusion is subframe #0, 1, 5, and 6. If the exclusion is fixed, then such 1-bit configuration is not needed. Table 7 illustrates a portion of an example resource pool configuration according to embodiments of the present disclosure.

TABLE 7

Resource Pool Configuration

| | Size (bits) | Information |
|---|---|---|
| . . . | . . . | . . . |
| Period of resource pool | | Period P. Number of frames |
| For each cell: { PCID | | Only for neighboring cell. For the serving cell, it can be omitted. (carrier index can also be provided together with PCID) |
| TDD or FDD | 1 | |
| TDD UL-reference configuration, or TDD UL-DL configuration (which is indicated in SIB1 of the cell/neighboring cell) | 3 | If it is TDD. |
| Bitmap | B | If it is TDD, each bit of the bitmap indicates whether a subframe (excluding subframe#0, subframe#5 in each frame) is used for as D2D resource, if TDD UL-DL configuration is not included. |

TABLE 7-continued

| | Resource Pool Configuration | |
|---|---|---|
| | Size (bits) | Information |
| | | If TDD UL-reference or TDD UL-DL configuration is not included, each bit of the bitmap indicates whether a subframe (only including the UL subframes as per the TDD UL-reference or TDD UL-DL configuration) is used for as D2D resource. If it is FDD, each bit of the bit map indicates whether a subframe (including all subframes) is used for as D2D resource. |
| Number of repetitions of bitmap | Ceiling($\log_2(D)$) | Number of repetitions of bitmap. D is the total number of possible values for the repetition number. |
| Offset within a period from where the bitmap starts, with respect to the serving cell SFN 0 | Ceiling($\log_2 C$) | In the unit of subframes. Offset with respect to the starting point of period of resource pool (which can be the first subframe of SFN 0 of the serving cell, or frame with SFN mod period = 0). C is the total number of possible values for the offset. |
| } | | |
| ... | ... | ... |

The resource pool configuration illustrated in Table 7 includes an indication of Number of repetitions of bitmap.

As an alternative, the resource pool configuration can have a duration of bitmap window where bitmap can be repeated, instead. If the bitmap window can allow partial bitmap if the window duration happens not to be an integer number of repetitions. If the bitmap window duration takes into account all the subframes, then for TDD case, as the bitmap can refer to subframes excluding subframe #0, #5 in each frame, or refer to the UL subframes, a mapping of the bitmap referred subframes and all the subframes in the bitmap window is needed to count the repetitions of bitmap. For example, for a TDD system, a 8-bit bitmap is used excluding subframe#0 and #5, then the 8-bit bitmap is corresponding to 10 subframes within the bitmap window. Alternatively, for a TDD system, the bitmap window can count the same way as how the bitmap is counted, such as subframes excluding subframe #0, #5 in each frame, or the UL subframes, respectively, as illustrated in Table 8 below.

TABLE 8

| | Resource Pool Configuration | |
|---|---|---|
| | Size (bits) | Information |
| ... | ... | ... |
| Duration of bitmap window where bitmap can be repeated | Ceiling($\log_2(E)$) | The duration of a window in which the bitmap can be repeated. E is the total number of possible values for the window duration. If the bitmap window can allow partial bitmap if the window duration happens not to be a integer number of repetitions. If the bitmap window duration takes into account all the subframes, then for TDD case, as the bitmap can refer to subframes excluding subframe #0, #5 in each frame, or refer to the UL subframes, a mapping of the bitmap referred subframes and all the subframes in the bitmap window is needed to count the repetitions of bitmap. Alternatively, for TDD, the bitmap window can count the same way as how the bitmap is counted, such as subframes excluding subframe #0, #5 in each frame, or the UL subframes, respectively. |
| ... | ... | ... |

The resource pool configuration illustrated in Table 7 includes an indication of an offset within a period from where the bitmap starts, with respect to the serving cell SFN 0. SFN 0 is referred to as the starting subframe of the frame. As an alternative, the resource pool configuration can have two other offsets, the offset of neighboring cell SFN 0 with respect to the serving cell's SFN0, and the offset within a period from where the bitmap starts, with respect to the neighboring cell's SFN 0. This method can save overhead. For example, the offset of neighboring cell SFN 0 with respect to the serving cell's SFN0 can be signaled and shared for multiple purpose, such as for inter-cell D2D discovery, inter-cell D2D communication, or any other inter-cell communication, such as a dual connectivity, etc. For the offset within a period from where the bitmap starts, with respect to the neighboring cell's SFN 0, the number of possible value of the offset can be limited, e.g., 16 values, and it may not need for every signal subframe within the period to be the offset. For D2D communication, it can have a default value being zeor for this offset, hence this offset within a period from where the bitmap starts, with respect to the neighboring cell's SFN 0 can be omitted. Table 9 below illustrates a portion of resoruce pool configuration, where the offset of neighboring cell SFN 0 with respect to the serving cell's SFN0 can be needed for asynchronous system, while it may not be needed for synchronous system where SFN is synchornized.

TABLE 9

Resource Pool Configuration

| | Size (bits) | Information |
|---|---|---|
| ... | ... | ... |
| ... | | |
| Offset of neighboring cell SFN 0 with respect to the serving cell's SFN0 | Ceiling($\log_2(F)$) | In the unit of subframes. Offset of neighboring cell SFN0 with respect to the serving cell's SFN 0. F is the total number of possible values for the offset. This field can have, for example, 14-bit. |
| Offset within a period from where the bitmap starts, with respect to the neighboring cell's SFN 0 | Ceiling($\log_2(G)$) | In the unit of subframes. Offset with respect to the starting point of period of resource pool (which can be the first subframe of SFN 0 of the neighboring cell, or frame with SFN mod period = 0). G is the total number of possible values for the offset. A default value can be 0. (If this field is omitted, it can mean the offset is 0). |
| ... | ... | ... |

An alternative is that a total offset can be defined and signaled, Offset_bitmap_servingSFN0, where the offset is within a period of resource pool from where the bitmap starts, with respect to the serving cell's SFN 0. The offset can be in the unit of subframes. The signaling can be for (Offset_bitmap_serving SFN0 modulo Period), so the value of the signaling can be a number of subframes within a period, where the period can be the period of resource pool.

Figure 11:
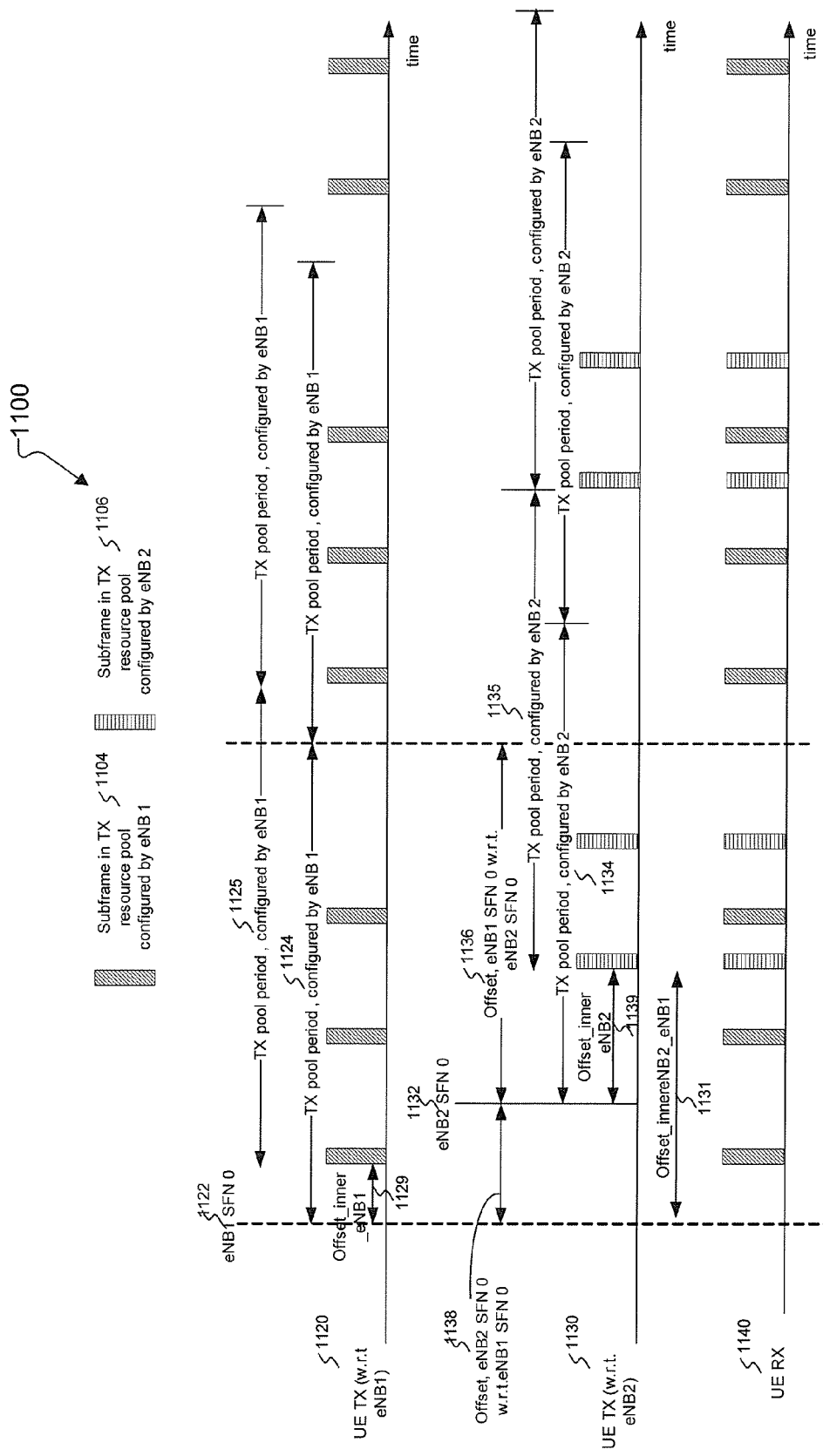
FIG. 11 illustrates the TX and RX resource pools and their respective timings according to embodiments of the present disclosure.

FIG. 11 illustrates the TX and RX resource pools 1100 including out of network coverage (OOC) resources determined by or based on D2D-FN) and their respective timings. This TX and RX resource pools can be in general for any TX pools, or RX pools, TX resources, RX resources, for discovery, for communication, for D2D sync signals (such as a D2DSS, PD2DSCH), SA, data, a discovery signal, and the like. Although FIG. 11 illustrates resource pools as example, it is not limited to a pool only, rather, can be for any D2D signal.

Referring to FIG. 11, a UE TX 1120 that has a reference timing derived from eNB1, receives TX pool and RX pool(s) configured by eNB1. The UE 1120 with respect to eNB1 can have a TX pool, based on eNB1 SFN 0 1122, with the TX pool period configured by eNB1 1124. An offset within the eNB1 configured TX pool period from where the TX resources are indicated (for example, by a bitmap or bitmaps) is referred to as Offset_inner_eNB1 1129. An alternative is that the period 1125 starts after the offset 1129, where the offset is described for the field in Table 5. For a UE that has reference timing derived from eNB2 1130, it can have TX pool and RX pool(s) configured by eNB2.

In the embodiment, RX UE 1140 is a UE associated with eNB1. The eNB1 can provide a RX pool with respect to the neighboring cell, eNB2, which has eNB2 SFN 0 1132. The eNB1 can provide, the period of RX/TX pool configured by eNB2 1134, the offset of eNB2 SFN0 with respect to eNB1 SFN0 1138, and an offset within the eNB2 configured RX/TX pool period from where the TX resources are indicated (for example, by a bitmap or bitmaps), referred to as Offset_inner_eNB2 1139 (An alternative is that the period 1135 starts after the offset 1139, where the offset is described for the field in Table 5). Alternatively, the eNB1 can provide a sum of Offset 1138 and Offset 1139, which is Offset_innereNB2 eNB1 1131, an offset within the eNB2 configured RX pool period from where the TX or RX resources are indicated, with respect to the eNB1 SFN0.

The RX UE 1140 can then derive the timing to monitor RX resource pool configured by eNB2 (at a timing of the first subframe of eNB1 SFN 0+Offset 1138+Offset 1139. Or at a timing of the first subframe of eNB1 SFN 0+Offset 1138*10+Offset 1139 if 1138 is in the unit of frame). The offset 1139 in the figure can be in the units of subframes. Or alternatively, the timing can be the first subframe of eNB1 SFN 0+Offset_innereNB2_eNB1 (1131).

It is noted that '+Offset 1138' and '−Offset 1136' can be equivalent and interchangeable in the above description, where Offset 826 is the Offset of eNB1 SFN 0 with respect to eNB2 SFN0 1136.

The RX UE can (as its implementation) start monitoring a little earlier (e.g., one subframe earlier) than the timing determined by SFN0 and offsets, in case there can be an error of partial or fraction of the subframe. The offsets give a rough timing. The UE can further refine the timing by using the sync signal or by detecting the sync signal of the respective cell, which can give symbol level accuracy of the synchronization. For example, the UE uses eNB1 timing as its RX timing to monitor the RX pools of eNB1, where the UE can get eNB1 timing (symbol level) from an eNB1 sync signal for other UEs which transmit a D2DSS/PD2DSCH which are transmitted at eNB1 timing. The UE uses eNB2 timing as its RX timing to monitor the RX pools of eNB2, where the UE can get eNB2 timing at subframe level based on the offsets, such as offsets with respect to eNB1 and inner offsets, and symbol level timing from an eNB2 sync signal for other UEs which transmit a D2DSS/PD2DSCH which are transmitted at eNB2 timing.

A UE can transmit a PD2DSCH which can carry the SFN of the cell from which the UE derives sync. In some cases, the signaling of offset of SFN0 of a neighboring cell with respect to SFN0 of a serving cell can be omitted (for example, 1138 in FIG. 11). The receiver UE in a cell (for example, cell1) can first attempt to decode the D2DSS and PD2DSCH from other UE in neighboring cell (for example, a UE in cell2). If the D2DSS and PD2DSCH coming from a UE in a neighboring cell (cell2) is detected, where the PD2DSCH can carry the SFN of the cell2, the RX UE can then figure out the D2D RX pool of the cell2, assume that the RX UE in cell1 can get signaling from cell1 on the RX pool of cell2, where the offset with respect to cell2 SFN0 can be signaled (for example, 1139 in FIG. 11). For a UE which supports the D2D communication, it can transmit a D2DSS and PD2DSCH, where for a UE which supports only the D2D discovery, it can transmit a D2DSS, and it can also transmit a PD2DSCH.

The timing (which subframe(s)) for D2DSS can be configured, or preconfigured for a cell, and can be the same or different for different cells. The offset to can be used to define when the first D2DSS is transmitted in 10240 subframes with respect to SFN0 of the serving cell, where SFN0 can be, for example, the first subframe of the frame with SFN=0, or the last subframe of the frame with SFN=0 (the SFN0 definition can be fixed). For a PD2DSCH, the period can be same or different from a D2DSS. If the period is the same, it can be possible to have a relative offset to indicate when the PD2DSCH (which subframe) is used, if a PD2DSCH is not in the same subframe as D2DSS. If a D2DSS is in the same subframe as a PD2DSCH, and they share the same periodicity, then the offsets for PD2DSCH can be omitted. In general, the periodicity, and the TX timing for PD2DSCH, or the resources for PD2DSCH, can be defined or configured in a similar way as a D2DSS.

The resource pool can be included in various signaling, for example, a common signaling such as a system information block (SIB) in the dedicated RRC signaling, or in a PD2DSCH, and so on. The resource pool can have the same configuration signaling format for these signaling, or they can be different. For example, the signaling of resource pool indicated by PD2DSCH can be more compressed than the RRC signaling (common or dedicated). The compression can be done, for example, by preconfiguring some of the fields, and leaving the remaining fields configured with the signaling.

Instead of having individual fields for signaling of the resource pool, it alternatively can list all the options and configuration of the resource pool, and index all these options one by one. Then the resource pool can be indicated by a respective index of the configuration.

In a TDD system, for D2D resources, the UL subframes may or may not apply the dynamic UL-DL reconfiguration, depending on the cycle of the D2D resources, and cycle of dynamic UL-DL reconfiguration. For example, if the cycle of the D2D resources, such as for D2D discovery, is much longer than the cycle of dynamic UL-DL reconfiguration, the D2D resources for discovery do not apply the dynamic UL-DL reconfiguration. If the cycle of the D2D resources, such as for D2D communications, is comparable or similar or shorter than the cycle of dynamic UL-DL reconfiguration, whether the D2D resources need to apply the dynamic UL-DL reconfiguration, can be configured by the network to the D2D UE. The network can signal the D2D UE on whether the dynamic UL-DL reconfiguration is applicable to the resources allocated to D2D. The UE will then determine the available D2D resources accordingly to whether the dynamic UL-DL reconfiguration is applicable.

One parameter (for example, 'discoveryPoolType') can be used to indicate the discovery resource pool. Regarding the parameter of 'discoveryPoolType', the following operation options can be considered. It is noted that the name of the parameter 'discoveryPoolType' can be different, and it is meant for being an example.

Option 1: a UE acquires a SIB from the serving cell. The SIB indicates a pool, without linking to any PCID. The UE should regard this pool as a TX pool for Type 1. Or the SIB indicates a pool associated with the serving cell's PCID. The UE should regard this pool as a RX pool for the serving cell, for both Type 1 &2. Or the SIB indicates a pool associated with a PCID that is not the serving PCID. The UE should regard this pool as a RX pool for a neighboring cell, for both Type 1 &2.

Option 2: A UE acquires a SIB from the serving cell. The SIB indicates a pool, without linking to any PCID. The UE should regard this pool as a TX pool for Type 1. The SIB indicates a pool, associated with a 'discoveryPoolType' (which can be Type 1, Type 2, or Common). The UE should regard this pool as a RX pool for the serving cell, for the respective type indicated by 'discoveryPoolType'. The SIB indicates a pool associated with a PCID that is not the serving PCID, and associated with a 'discoveryPoolType' (which can be Type 1, Type 2, or Common). The UE should regard this pool as a RX pool for a neighboring cell, for the respective type indicated by 'discoveryPoolType'.

Option 3: UE acquires SIB from serving cell. The SIB indicates a pool, without linking to any PCID. The UE should regard this pool as a TX pool for Type 1. The SIB indicates a 'discoveryPoolType' (which can be Type 1, Type 2, or Common). For the indicated 'discoveryPoolType', if the SIB further indicates a pool, without linking to any PCID, the UE should regard this pool as a RX pool for the serving cell, for the respective type indicated by 'discoveryPoolType'. If the SIB further indicates a pool, associated with a PCID that is not the serving PCID, the UE should regard this pool as a RX pool for a neighboring cell, for the respective type indicated by 'discoveryPoolType'. Then SIB again indicates a 'discoveryPoolType', whose value can be different from the one already used above, then repeat.

For example, if there are 10 cells in total, 3 cells can have RX type 1 and type 2 differently set, and 7 cells with common RX pools for type 1 and 2, then in SIB, it can have 'discoveryPoolType'=Type 1, followed by 3 pools, each with a PCID, and then discoveryPoolType'=Type 2, followed by 3 pools, and then 'discoveryPoolType'=Common, followed by 7 pools.

Option 4: it is similar to Option 3, but a pool is sorted based on a PCID, not 'discoveryPoolType': for exmaple, if there are 10 cells in total, 3 cells can have RX type 1 and type 2 differently set, and 7 cells with common RX pool for type 1 and 2, then in SIB, for the 3 cells which have RX type 1 and type 2 differently set, it can have PCID1, 'discoveryPoolType'=Type 1, followed by 1 pool, and 'discoveryPoolType'=Type 2, followed by 1 pool. Then it can have PCID2, 'discoveryPoolType'=Type 1, followed by 1 pool, and 'discoveryPoolType'=Type 2, followed by 1 pool. Then similar for PCID3. Then for PCID4-10, each will have one pool followed. 'discoveryPoolType'=Common can be omitted—as a default value. Option 4 can have less overhead.

Discovery resource can alternatively indicated by the following embodiments.

It is assumed that a RX pool for type 1 and type 2 can be indicated as a union. In SIB, the serving cell indicates a pool, without linking to any PCID. The UE should regard this pool as a TX pool for Type 1 for the serving cell. The SIB includes a 1-bit indicator 'discoveryServingTxRxSame' (which indicates whether the discovery RX pool for the serving cell is Type 1 or not type 1). If 'discoveryServingTxRxSame'=yes (value '0'), the serving cell omits signaling for RX pool for the serving cell. The UE regards RX pool for the serving cell is the same as the TX pool for the serving cell. If 'discoveryServingTxRxSame'=no (value '1'), the serving cell further provides a RX pool (which will be a union of type 1 and type 2) for the serving cell. The UE regards RX pool for the serving cell which is a union of type 1 and type 2. An alternative is that the serving cell provides a RX pool of type 2, and the UE will perform union operation to have a union of RX pool of type 2 and TX pool of type 1 of the serving cell, to form its RX pool for the serving cell. In SIB, it further provides one RX pool (which will be a union of the RX pool for type 1 and type 2), for each of the neighboring cell, with a respective PCID (and carrier index if needed).

It is assumed that the RX pools for type 1 and type 2 can be indicated as a union, or separately for type 1 and type 2. In SIB, the serving cell indicates a pool, without linking to any PCID. The UE should regard this pool as a TX pool for Type 1 for the serving cell. In SIB, it indicates 1-bit indicator 'discoveryServingTxRxSame' (which indicates whether the discovery RX pool for the serving cell is Type 1 or not type 1). If 'discoveryServingTxRxSame'=yes (value '0'), the serving cell omits signaling for RX pool for the serving cell. The UE regards that RX pool for the serving cell is the same as the TX pool for the serving cell. If 'discoveryServingTxRxSame'=no (value '1'), the serving cell further provides 1-bit 'discoveryServingRXnum' (which indicates whether the number of RX pools). The UE should regard the TX pool is for type 1 RX pool for the serving cell (serving cell does not repeat the information for type 1 RX pool for the serving cell). If 'discoveryServingRXnum'=2 (value '0'), information is provided for RX pool for type 2) for the serving cell. The UE regards a RX pool for the serving cell: type 2 RX pool as indicated, and type 1 RX pool the same as TX pool. If 'discoveryServingRXnum'=1 (value '1'), a RX pool (which will be a union of type 1 and type 2 if both types are supported, or either type 1 or type 2 where the other type is not supported) for the serving cell. The UE regards RX pool for the serving cell which is a union of RX pool for type 1 and RX pool for type 2. Alternatively, the parameter 'discoveryServingRXnum' can be omitted and it can implicitly signaled. For example, the serving cell can anyways send a Rx pool for type 2 of the serving cell, and the UE needs to have a union of TX pool of type 1 (if any) and RX pool of type 2 for the serving cell.

An alternative for indicating resource pool for the serving cell can be as follows. If a serving cell supports Type 1, the SIB indicates a TX pool, without linking to any PCID. If it does not support Type 1, the SIB omits the TX pool. The UE should regard this pool as a TX pool for Type 1 (if any) for the serving cell. In SIB, it can provide a RX pool, without linking to any PCID, and the RX pool is for the serving cell. A first option is that the RX pool for the serving cell is all what the UE should monitor for the serving cell (for example, a union of the RX pool of Type 1 and RX pool of Type 2). A second option is that the RX pool for the serving cell indicated in SIB is a RX pool of Type2. The first option or the second option can be fixed or preconfigured, so it may not need to use signaling to indicate which option is used. If the RX pool for the serving cell is omitted in SIB, the UE should regard the RX pool for the serving cell is the same as the TX pool (Type 1) provided in the serving cell. If the RX pool for the serving cell presents in SIB, the UE can regard the pool as the RX pool of the serving cell if the cell uses the first option to indicate RX pool for the serving cell. Or alternatively, if the cell uses the second option to indicate RX pool for the serving cell, the UE can have an union operation, to have the RX pool of the serving cell as the union of the SIB indicated TX pool of the serving cell and the SIB indicated RX pool of the serving cell (this case can be applicable, for example, if the SIB indicated RX pool can be for Type 2 discovery). With this method, the 'discoveryServingTxRxSame' parameter can be omitted, and it is implicitly indicated by whether to have an RX pool for the serving cell indicated in SIB or not.

To indicate a RX pool for a neighboring cell, the following options can be used. The SIB provides one or two RX pool(s), for each of the neighboring cell, with a respective PCID (and a carrier index if needed). A parameter, for example, 'discoveryNbrRXnum', is indicated, whose value can be "1 RX pool, 2RX pools'.

Option I: This parameter, 'discoveryNbrRXnum', can be used for each neighboring cell. If 'discoveryNbrRXnum'=2 (value '0'), it indicates the pool info (followed) is for a type 1 RX pool followed by a type 2 RX pool for the respective NBR cell. If 'discoveryNbrRXtype'=1 (value '1'), it indicates the pool info (followed) is a union of type 1 and type 2 RX pool for the respective NBR cell if both type 1 and type 2 are supported, or the pool information is for RX pool for type 2 or type 1 if type 1 or type 2 is not supported, respectively. The RX UE may not need to know whether it is only one type is supported, or both types are supported. An alternative is that a pool type indication can be associated with each pool, for example, for type 1 pool it can have a pool type indication as value '1', and for type 2 pool it can have a pool type indication as value '0'. Or alternatively, instead of having a pool type indication with explicit 1-bit indication, such indication can be implicit, for example, by using different information element (IE) in RRC message. For example, an IE can be for type 1 RX pool, and a different IE can be for type 2 RX pool. If the respective neighboring cell does not support a certain type, the information on the pool with respective type can be omitted. Then the number of discovery RX pool for each neighboring cell can be implicitly derived (no need to be signaled), based on which pool(s) with which type is included in SIB.

Option II: the parameter 'discoveryNbrRXnum' is the same configuration (same value) for all the neighboring cells. This parameter can be indicated just once in SIB for all the NBR cells.

For D2D communications, similar operations can be for a SA resource pool or a data resource pool, with discovery replaced by SA, or data, Type 1 replaced by Mode 2, Type 2 replaced by Mode 1. For example, the Option 1 above can be extended for SA resources for Mode 1 and Mode 2. A UE acquires a SIB from the serving cell. The SIB indicates a pool, without linking to any PCID. The UE should regard this pool as a TX pool for Mode 2. The SIB indicates a pool, associated with the serving cell's PCID. The UE should regard this pool as a RX pool for the serving cell, for both Mode 1 &2. The SIB indicates a pool, associated with a PCID which is not the serving PCID. The UE should regard this pool as a RX pool for a neighboring cell, for both Mode 1 &2.

For another example, in SIB, the serving cell indicates a pool, without linking to any PCID. The UE should regard this pool as a TX pool for mode 2 for the serving cell. The SIB includes a 1-bit indicator 'saServingTxRxSame' (which indicates whether the SA RX pool for the serving cell is mode 2 or not). If 'saServingTxRxSame'=yes, the serving cell omits signaling for RX pool for the serving cell. The UE regards RX pool for the serving cell is the same as the TX pool for the serving cell. If 'saServingTxRxSame'=no, the serving cell further provides a RX pool (which will be a union of mode 1 and mode 2) for the serving cell. The UE regards a RX pool for the serving cell which is a union of mode 1 and mode 2. An alternative is that the serving cell provides a RX pool of Mode 1, and the UE will perform union operation to have a union of RX pool of Mode 1 and TX pool of Mode 2 of the serving cell, to form its RX pool for the serving cell. In SIB, it further provides one a RX pool (which will be a union of the RX pool for mode 1 and mode 2 (in case that, e.g., mode1 is not supported, it means RX pool is for mode 2, but the UE may not need to know whether mode 1 is supported or not), for each of the neighboring cell, with a respective PCID (and carrier index if needed).

An alternative for indicating a resource pool for the serving cell can be as follows. If a serving cell supports Mode 2, the SIB indicates a TX pool, without linking to any PCID. If it does not support Mode 2, the SIB can omit the TX pool. The UE should regard this pool as TX pool for Mode 2 (if any) for the serving cell. The SIB can provide a RX pool, without linking to any PCID, and the RX pool is for the serving cell. A first option is that the RX pool for the serving cell is all what the UE should monitor for the serving cell (for example, a union of the RX pool of Mode 1 and RX pool of Mode 2). A second option is that the RX pool for the serving cell indicated in the SIB is a RX pool of Mode 1. The first option or the second option can be fixed or preconfigured, so it may not need to use signaling to indicate which option is used. If the RX pool for the serving cell is omitted in the SIB, the UE should regard the RX pool for the serving cell is the same as the TX pool (Mode 2) provided in the serving cell. If the RX pool for the serving cell presents in SIB, the UE can regard the pool as the RX pool of the serving cell if the cell uses the first option to indicate RX pool for the serving cell. Or alternatively, if the cell uses the second option to indicate RX pool for the serving cell, the UE can have an union operation, to have the RX pool of the serving cell as the union of the SIB indicated TX pool of the serving cell and the SIB indicated RX pool of the serving cell (this case can be applicable, for example, if the SIB indicated RX pool can be for Mode 1 communication). The first option or the second option can be fixed or preconfigured, so the UE can use the respective operation to treat the RX pool. With this method, the 'saServingTxRxSame' parameter can be omitted, and it is implicitly indicated by whether to have an RX pool for the serving cell indicated in SIB or not.

If there are N pools at lower layer (for example, layer 1, L1), at higher layer (for example, layer 2, L2) it can choose to signal N pools or less than N pools in system information block (SIB), due to the consideration of overhead.

In some embodiments, for the D2D communications Mode 2 operation, there can be parameters such as contention window size configured for each transmission resource pool. A first resource pool for Mode 2 transmission can be configured for UE to use in exceptional cases that the UE can autonomously enter (for example, the cases related to using Mode 2 when timer T301 or T311 is running), and a second resource pool for Mode 2 transmission can be configured for the UE to use when the UE is situations other than the exceptional cases. For the first resource pool, a first set of parameters can be configured, such as a first contention window size (e.g., with a smaller value), a first waiting time (e.g., with a smaller value) before the contention window starts, and so on. For the second resource pool, a second set of parameters can be configured, such as a second contention window size, a second waiting time before the contention window starts, and so on. The first resource pool and the second resource pool can be the same, the different, orthogonal, or overlapped. The first set of parameters for the first resource pool such as the first contention window size, the first waiting time before the contention window starts can be the same, the different, or some parameters are the same, and some are different.

The first or the second pool, and the respective first or the second set of parameters such as the contention window size, the waiting time before the contention window starts, the pool can be signaled to the UE by dedicated signaling, by SIB, or can be preconfigured (such as in out of coverage case). They can be signaled separately, or there can be one common pool, but with the first and the second set of parameters respectively for the conditions. For example, the SIB can signal one common pool, but with the first set of parameters such as the contention window size, the waiting time before the contention window starts, for the UEs to use in exceptional cases that the UE can autonomously enter (for example, the cases related to using Mode 2 that UE autonomously switch from Mode 1 to Mode 2, or entering Mode 2); and with the second set of parameters for the UEs to use in situations other than exceptional cases. For another example, the SIB can signal two pools mentioned above, and for each pool, the SIB has a respective set of parameters such as the contention window size, the waiting time before the contention window starts. Similar situations can be considered for the UE dedicated signaling case, and the preconfigured case for a resource pool.

For all these pools, these parameters can be applied for per cell, and for the neighbor base stations, they can also be signaled for reception purpose for the receiver UE. The timing for inter-cell case and inter-cell operations discussed in other embodiments in the disclosure can also apply.

In some embodiments, the different TX and RX behaviors can be employed for different scenarios of the sync signal transmitted for D2D discovery, and the sync signal transmitted for D2D communication.

It is assumed that UE1 is associated with Cell1. UE2 and UE3 are associated with Cell2. UE2 transmits a D2DSS for discovery. UE3 transmits a D2DSS for communication. UE1 needs to receive discovery signal from UE2. It is assumed that Cell1 provides UE1 a discovery resource pool of Cell2, a coarse timing offset with respect to the timing of the serving cell, together with PCID of Cell2, and D2DSS sequence for UE to transmit for discovery in Cell2. The following operation can be considered for UE1 to detect discovery signal from UE2.

Case 1: UE1 detects PCID from Cell2. UE1 finds out discovery resource pool of Cell2 based on PCID of Cell2, then it tries to detect discovery signal.

Case 2: UE1 does not detect PCID from Cell2, but it detects a D2DSS with the sequence for discovery for Cell2 from a UE (UE2) (for example, the timing (such as an offset with respect to the reference timing in Cell1 (e.g., SFN0 of Cell1) of the D2DSS for TX UEs in Cell2 can be informed to UE1 and UE1 can detect the D2DSS from UEs in Cell2). UE1 tries to detect a discovery signal. UE1 also can find out the discovery resource pool of Cell2 based on D2DSS for discovery of Cell2. Then it tries to detect a discovery signal in later time based on the discovery resource pool or discovery resource period. The D2DSS from UE2 can serve a finer alignment of the timing.

Case 3: UE1 does not detect a PCID from Cell2, but it detects a D2DSS that is not with the sequence for discovery for Cell2 from a UE (assume UE1 detects D2DSS from UE3, where the D2DSS is for communication.) UE1 further detects PD2DSCH, and decode it, finds the PCID of the cell (Cell2) that UE3 derives reference timing from. UE1 finds out discovery resource pool of Cell2 based on the PCID of Cell2, then it tries to detect a discovery signal. The D2DSS from UE3 can also serve finer alignment of the timing. If the D2DSS from UE3 (for communication) is the same as the D2DSS for discovery (for example, from UE2), then, UE1 can find out discovery resource pool of Cell2 based on D2DSS associated with Cell2, and the UE does not need to detect a PD2DSCH.

More scenarios for the resource pools configuration are provided as below.

It is assumed that the network support both communication (Comm.) and discovery (Disc). If there is same configuration of D2DSS transmission for communication and discovery, then TX UE with discovery only may not transmit any additional D2DSS for discovery. Only the Comm. A D2DSS will be transmitted. A RX UE with discovery only will be provided by the serving cell about the neighboring (NBR) cells' discovery periodicity. The RX UE with discovery only can then try to find D2DSS for communication, but the periodicity of such trying can be the minimum of all the discovery periodicities of all the NBR cells. This is because the UE does not know which NBR cell to monitor, so the worst case is to use the minimum of all the periodicities, but within one period, the UE only need to open up for the period of time which can be the same as the period of D2DSS for communication, if no offset of neighboring cell's transmitting time with respect to the serving cell timing. If the timing offset is provided (the offsets are described as in FIG. 8, for example, the relative timing of the D2DSS of the serving cell with respect to the reference timing of the serving cell (SFN0 of the serving cell), and the relative timing of the neighboring cell with respect to the serving cell's reference timing (SFN0 of the serving cell), the RX UE with discovery can have a monitoring window size smaller, which can be according to the offset. The RX UE with discovery only can then need to decode the PD2DSCH to get the PCID of NBR cell, and find out the discovery resource pool. It can save energy and resource for the D2DSS transmission for TX UE with discovery. It can have a lower chance for the RX UE with the discovery to receive a D2DSS, if there are many TX UEs with the discovery, but not many UEs with communication.

The D2DSS for communication can use a D2DSS sequence which can be UE specific, or it can be cell specific (for example, the UE in coverage can have cell specific D2DSS sequence, while for the UE which is out of coverage it can use UE specific sequence; or any UE can use UE specific sequence). The D2DSS for discovery can use a cell specific sequence. For in coverage UE, if for the communication case it uses cell specific sequence of D2DSS, the D2DSS sequence can be the same as the one to be used for discovery.

Figure 12:
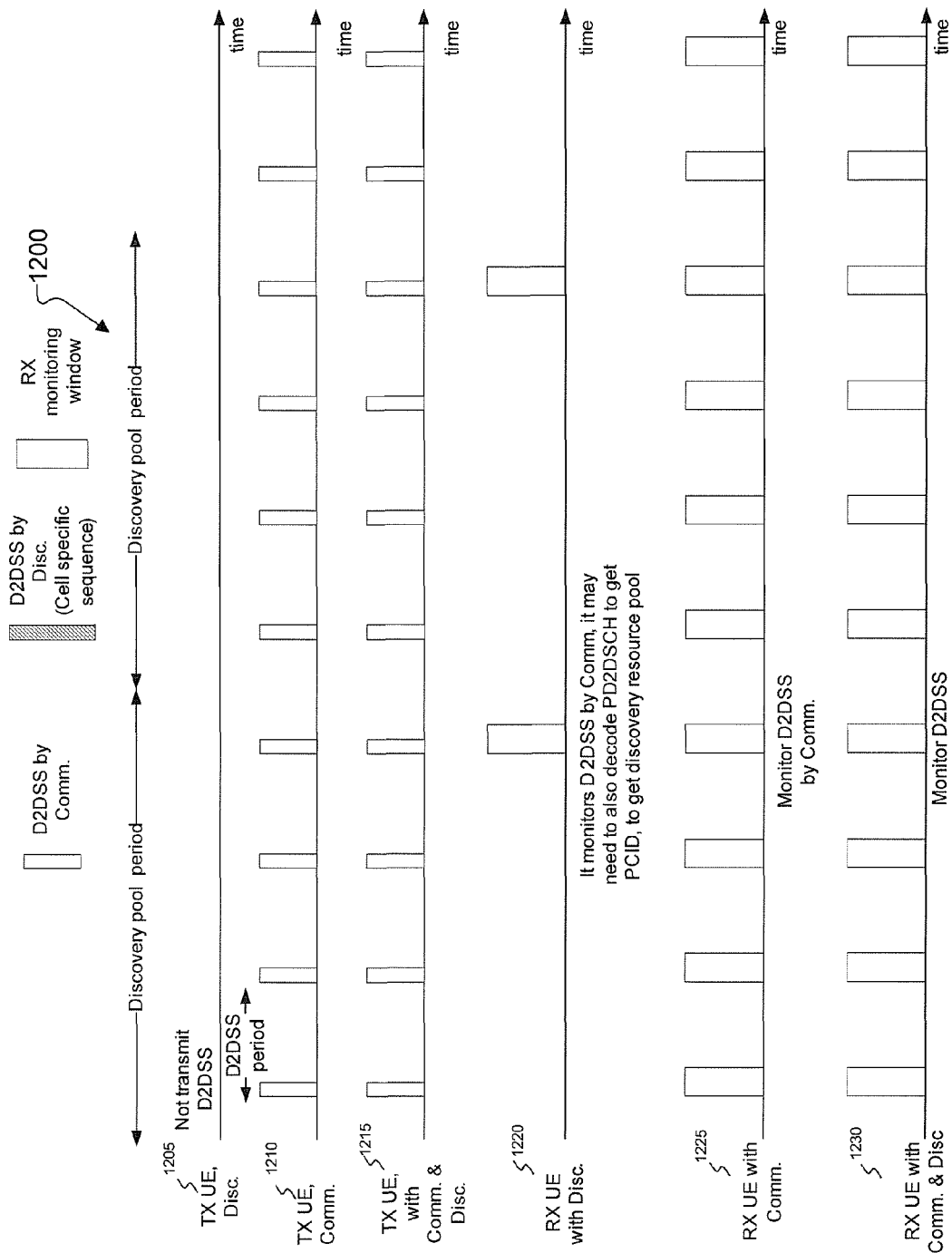
FIG. 12 illustrates TX resource and RX resource pools in which the discovery pool period can be typically longer than the D2DSS period for communication according to embodiments of the present disclosure.

FIG. 12 illustrates TX resource and RX resource pools 1200 in which the discovery pool period can be typically longer than the D2DSS period for communication according to embodiments of the present disclosure. The embodiment shown in FIG. 12 is for illustration only. Other embodiments could be used without departing from the scope of the present disclosure.

The definition of discovery pool period can be such as shown in Table 5, or FIG. 8. The TX UE with discovery only 1205 does not transmit a D2DSS. The TX UE with communication 1210 and the TX UE with communication and discovery 1215 can transmit a D2DSS for communication.

The RX UE with discovery 1205 can have a monitoring window size of a period of D2DSS sync, if no offset of neighboring cell's transmitting time with respect to the serving cell timing. If the timing offset is provided, the RX UE with discovery 1205 can have a monitoring window size smaller, which can be according to the offset. The RX UE with the discovery only 1205 can need to monitor a D2DSS by communication, and it can need to decode the PD2DSCH, to find the PCID, and then figures out the discovery pool. If the D2DSS is of same sequence for the communication and discovery, the UE can use detected the D2DSS to figure out the resource pool (the resource pool can be indexed or associated with the D2DSS sequence). The RX UE with communication only 1210, or the RX UE with communication and discovery 1215, monitors a D2DSS by communication After the D2DSS is detected, and pool configuration is obtained, the UE can further try to detect the discovery signal in the discovery pool (for example, in the coming next discovery period).

It is assumed that the network support both communication and discovery. The assumption that same configuration of D2DSS transmission for communication and discovery is relaxed, and TX UE with discovery only can also transmit additional D2DSS for discovery, while TX UE with Comm., the D2DSS for communication will be transmitted. TX UE with both communication and discovery transmits both D2DSS for communication and discovery.

Figure 13:
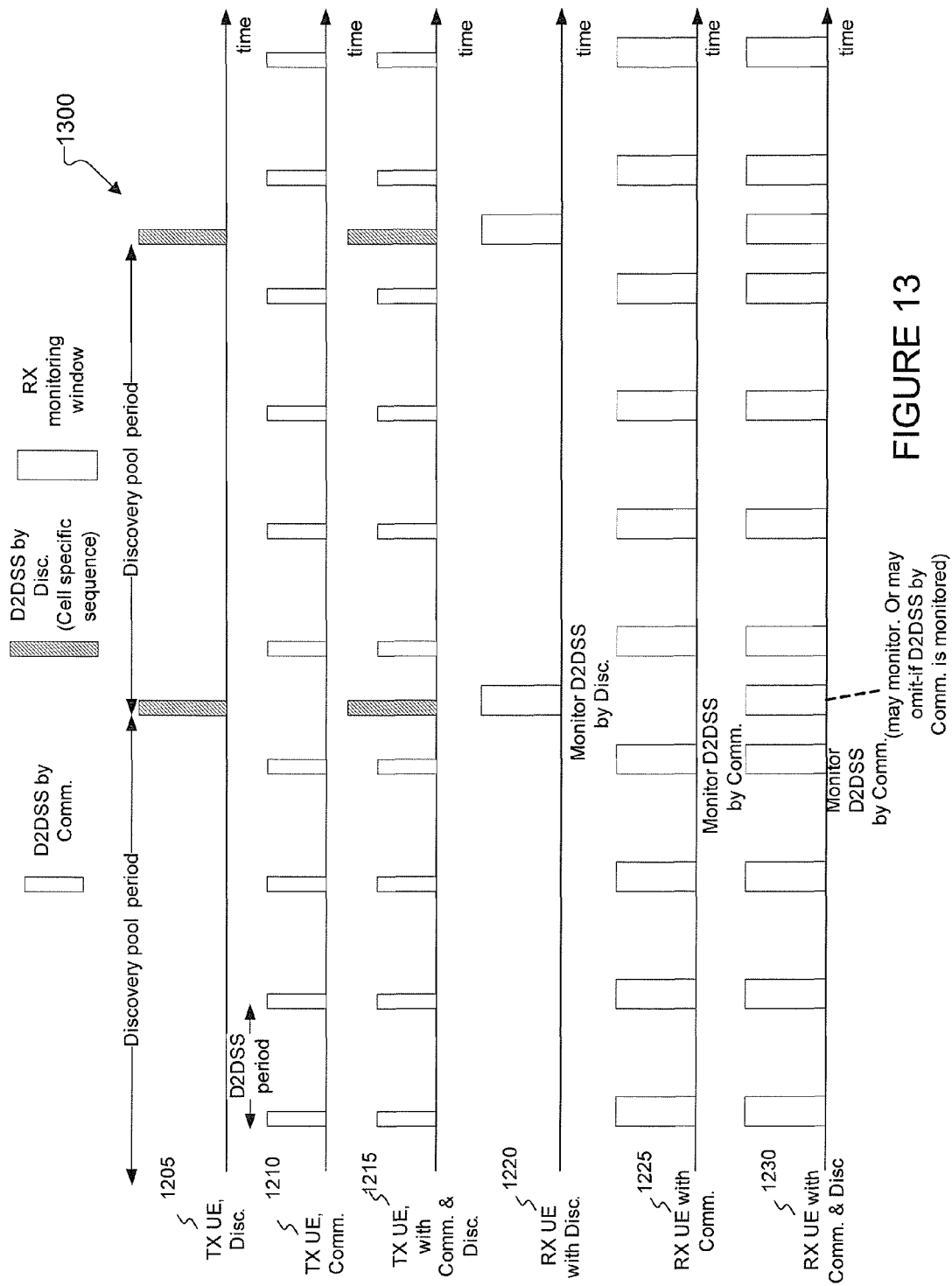
FIG. 13 illustrates TX resource and RX resource pools in which the TX UE with discovery only does not transmit a D2DSS according to embodiments of the present disclosure.

The time domain resource for D2DSS for discovery case can be different from the resource for D2DSS for communication case (e.g., in different subframes), as illustrated in FIG. 13 below.

The UE with discovery or communication or both can decouple the operation. The TX UE for discovery only, or RX UE for discovery only needs to take care of discovery. They do not need to know the communication resource. The RX UE with discovery may not need to monitor a D2DSS by communication. This simplifies the UE operation at a cost of more TX signaling.

FIG. 13 illustrates TX resource and RX resource pools 1300 in which the TX UE with discovery only does not transmit a D2DSS according to embodiments of the present disclosure. The embodiment shown in FIG. 13 is for illustration only. Other embodiments could be used without departing from the scope of the present disclosure.

The TX UE 1210 with communication can transmit a D2DSS for communication, and TX UE 1215 with communication and discovery can transmit a D2DSS for communication and D2DSS for discovery. RX UE 1220 with discovery only can need to monitor a D2DSS by discovery, RX UE 1225 with communication only monitors a D2DSS by communication, RX UE 1230 with communication and discovery can monitor a D2DSS by discovery, or can monitor a D2DSS by communication, or monitor both. If a UE monitors a D2DSS by discovery, it can find out the resource pool based on the D2DSS sequence. If a UE monitors a D2DSS by communication, the UE can need to further find out a PD2DSCH and find out a PCID, from which the UE can further find out the resource pool for discovery. If the D2DSS sequence for discovery and communication is the same (for example, cell specific), then, the UE can determine the resource pool for discovery based on the detected D2DSS, without the need to find out a PCID in a PD2DSCH. In the figure, the first subframe in the discovery resource within discovery period can be used for the D2DSS transmission.

It is assumed that the network support both communication and discovery. The assumption that same configuration of D2DSS transmission for communication and discovery is relaxed, and the TX UE with discovery only can also transmit an additional D2DSS for discovery, while the TX UE with communication will transmit the D2DSS for communication.

The D2DSS for discovery case and D2DSS for communication case can be in the same subframe, as illustrated in FIG. 11. This can reduce the RX UE's monitoring time. The UE with communication and discovery, can transmit both D2DSS for communication and the D2DSS for discovery, in different resources within the same subframe (e.g., different symbols, frequency bands), as these two resources are different. UE with discovery or communication or both can decouple the operation. The TX UE for discovery, or the RX UE for discovery, only needs to take care of discovery. They do not need to know the communication resource. The RX UE with disc may not need to monitor a D2DSS by communication. The UE with both communication and discovery can need to transmit an additional D2DSS for discovery. If the D2DSS sequence for discovery and communication is the same (for example, cell specific), then, these two D2DSS signals for discovery and communication will become one D2DSS signal for the TX UE with communication and discovery.

Figure 14:
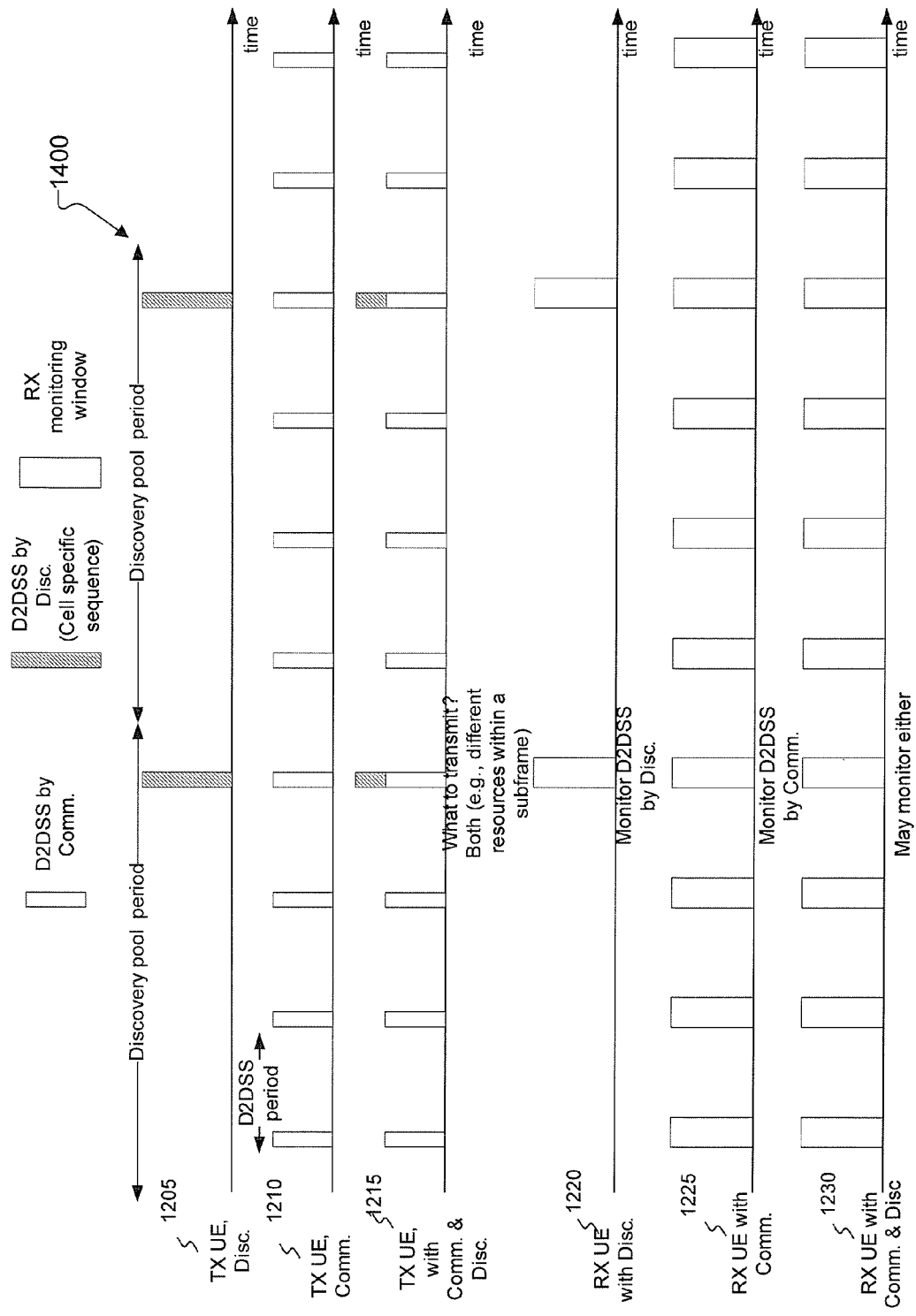
FIG. 14 illustrates TX resource and RX resource pools in which the TX UE with discovery only transmits a D2DSS for discovery according to embodiments of the present disclosure.

FIG. 14 illustrates TX resource and RX resource pools 1400 in which the TX UE with discovery only transmits a D2DSS for discovery according to embodiments of the present disclosure. The embodiment shown in FIG. 14 is for illustration only. Other embodiments could be used without departing from the scope of the present disclosure.

The TX UE 1210 with communication can transmit a D2DSS for communication, and TX UE 1215 with communication and discovery can transmit a D2DSS for communication and D2DSS for discovery in a same subframe. The TX UE 1205 with discovery can transmit a D2DSS in a same subframe as the TX UE with communication. To make it the same subframe, the subframe in the discovery resource before the next coming discovery period can be used for D2DSS transmission if the discovery pool period is configured not happening to have a first subframe in the period coincidently to be the D2DSS subframe for the TX UE 1210 with communication. Or alternatively, the discovery pool period can be shifted or configured to make the D2DSS subframe as the first subframe in the discovery resource pool. RX UE 1220 with discovery only can need to monitor a D2DSS by discovery; RX UE 1225 with communication only monitors a D2DSS by communication; and RX UE 1230 with communication and discovery can monitor a D2DSS by discovery, or can monitor a D2DSS by communication, or monitor both. If a UE monitors a D2DSS by discovery, the UE can find out the resource pool based on the D2DSS sequence. If the UE monitors a D2DSS by communication, the UE can need to further find out a PD2DSCH and find out a PCID, from which the UE can further find out the resource pool for discovery. If the D2DSS sequence for discovery and communication is the same (for example, cell specific), then, the UE can determine the resource pool for discovery based on the detected D2DSS, without the need to find out a PCID in a PD2DSCH. In the figure, the subframe in the discovery resource right before the next coming discovery period can be used for the D2DSS transmission.

It is assumed that the network support both communication (Comm.) and discovery (Disc). The assumption that same configuration of D2DSS transmission for communication and discovery is relaxed, and TX UE with discovery only can also transmit additional D2DSS for discovery, while TX UE with Comm., the D2DSS for communication will be transmitted.

The D2DSS for discovery case and the D2DSS for communication case can be in the same subframe. For the TX UE with both communication and discovery, it can omit a D2DSS for discovery, and it transmits a D2DSS for communication, as illustrated in FIG. 12.

The UE with both communication and discovery can need to consume fewer resources and less energy to transmit an additional D2DSS for discovery. RX UE with Disc can need to monitor a D2DSS for by discovery, and it can also monitor a D2DSS by communication. And it can need to decode the PD2DSCH for the PCID to get the resource pool of NBR cell if it does not detect sync of the NBR cell. If the network has many TX UEs with Comm. & Disc, but not many TX UEs with discovery only, the chance for the RX UE with discovery to detect D2DSS for discovery can be lower.

Figure 15:
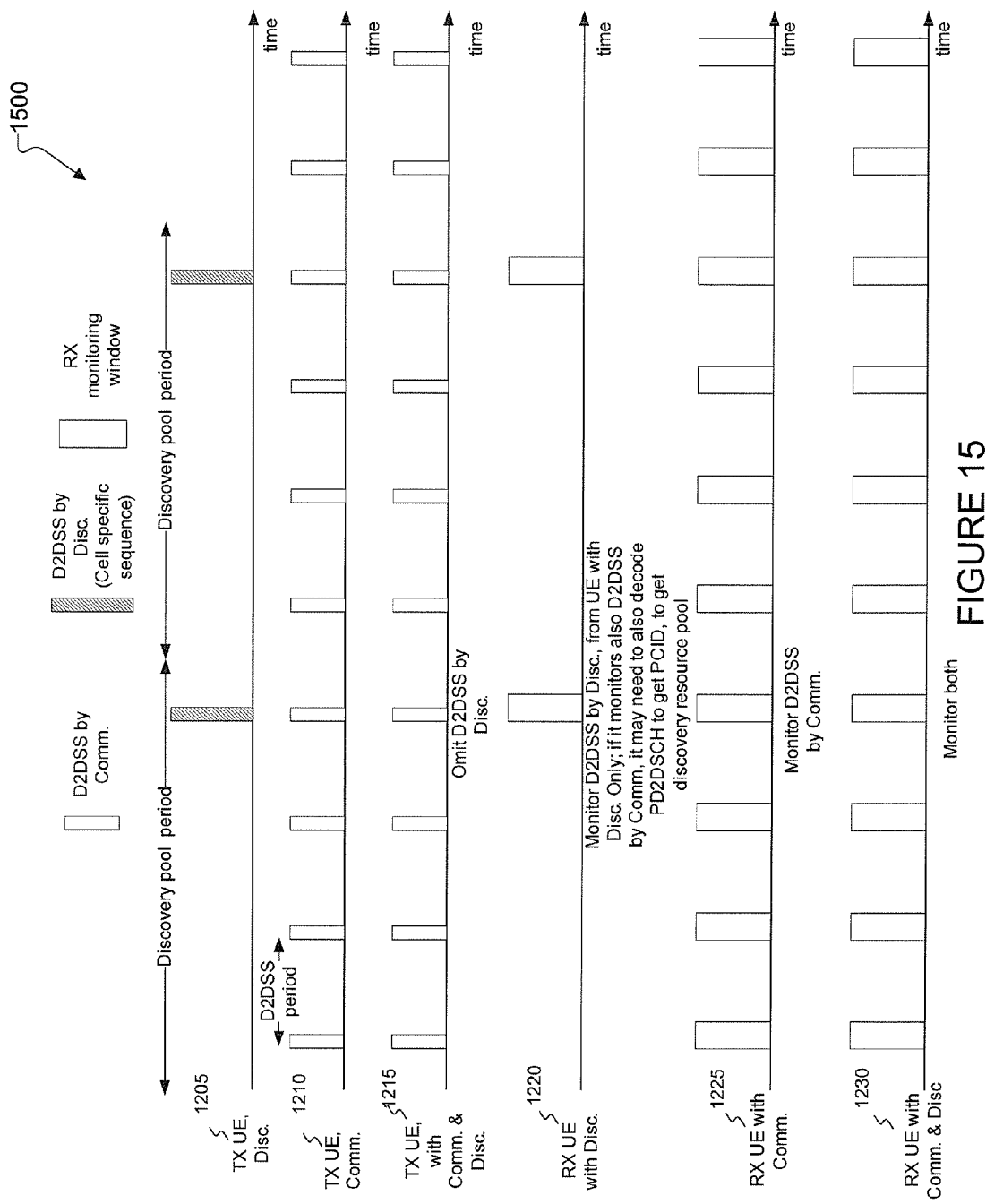
FIG. 15 illustrates TX resource and RX resource pools in which the TX UE with discovery only transmits a D2DSS for discovery according to embodiments of the present disclosure.

FIG. 15 illustrates TX resource and RX resource pools 1500 in which the TX UE with discovery only transmits a D2DSS for discovery according to embodiments of the present disclosure. The embodiment shown in FIG. 15 is for illustration only. Other embodiments could be used without departing from the scope of the present disclosure.

The TX UE 1210 with communication can transmit a D2DSS for communication, and TX UE 1215 with communication and discovery can transmit a D2DSS for communication. TX UE 1205 with discovery can transmit a D2DSS in a same subframe as the TX UE with communication. To make it the same subframe, the subframe in the discovery resource before the next coming discovery period can be used for D2DSS transmission if the discovery pool period is configured not happening to have a first subframe in the period coincidently to be the D2DSS subframe for TX UE with communication. Or alternatively, the discovery pool period can be shifted or configured to make the D2DSS subframe as the first subframe in the discovery resource pool. RX UE 1220 with discovery only can need to monitor a D2DSS by discovery, and can monitor a D2DSS by communication. RX UE 1225 with communication only monitors a D2DSS by communication. RX UE 1230 with communication and discovery can monitor a D2DSS by discovery, or can monitor a D2DSS by communication, or monitor both. If a UE monitors a D2DSS by discovery, the UE can find out the resource pool based on the D2DSS sequence. If the UE monitors a D2DSS by communication, the UE can need to further find out PD2DSCH and find out a PCID, from which the UE can further find out the resource pool for discovery. If the D2DSS sequence for discovery and communication is the same (for example, cell specific), then, the UE can determine the resource pool for discovery based on the detected D2DSS, without the need to find out a PCID in a PD2DSCH. In the figure, the subframe in the discovery resource right before the next coming discovery period can be used for the D2DSS transmission.

It is assumed that the network supports both communication and discovery. The assumption that same configuration of D2DSS transmission for communication and discovery is relaxed, and a TX UE with discovery only can also transmit an additional D2DSS for discovery, while a TX UE with communication transmits a D2DSS for communication.

The D2DSS for discovery case and D2DSS for communication case can be in the same subframe. For a TX UE with both communication and discovery, it can omit a D2DSS for communication, as illustrated in FIG. 16 below.

A UE with both communication and discovery can need to consume fewer resources and less energy to transmit a D2DSS for communication Also it can simplify RX UE with Disc behavior as it does not need to monitor a D2DSS by communication The RX UE with communication can need to skip a D2DSS by communication in the subframe for D2DSS by discovery, and it should take this into account for the measurement accumulation for a D2DSS by communication.

Figure 16:
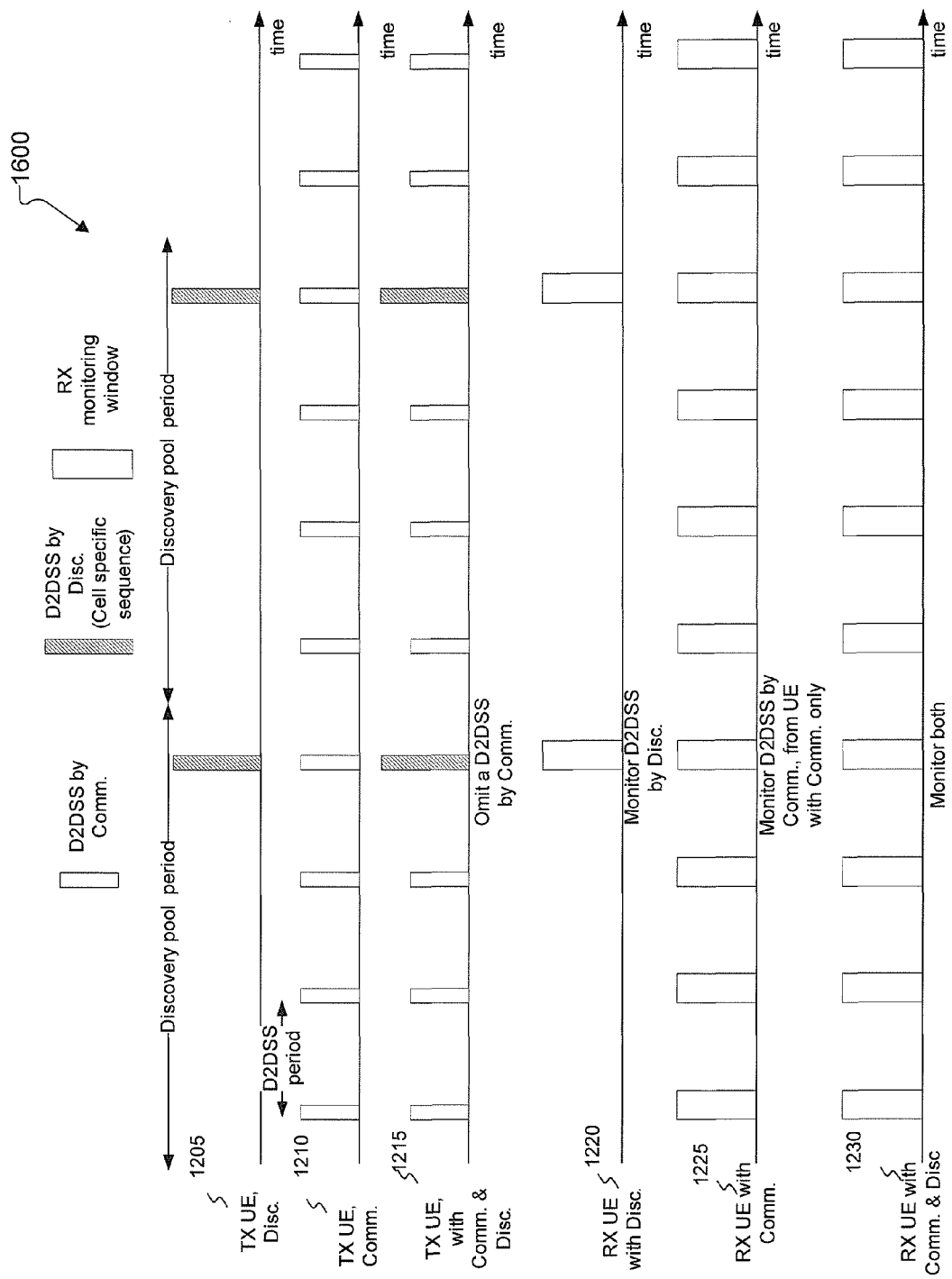
FIG. 16 illustrates TX resource and RX resource pools in which the TX UE with the discovery only can transmit a D2DSS according to embodiments of the present disclosure.

FIG. 16 illustrates TX resource and RX resource pools 1600 in which the TX UE with the discovery only can transmit a D2DSS according to embodiments of the present disclosure. The embodiment shown in FIG. 16 is for illustration only. Other embodiments could be used without departing from the scope of the present disclosure.

The TX UE with communication 1210 can transmit a D2DSS for communication. TX UE with communication and discovery 1215 can transmit a D2DSS for communication if in the time domain it does not align with the D2DSS for discovery, otherwise (if the time domain resource for a D2DSS for communication collides with a D2DSS for discovery), the UE 1215 transmits a D2DSS for discovery, and omit the D2DSS for communication. If the D2DSS sequence is the same for discovery and communication, then, the UE 1210 for communication can transmit the D2DSS for communication (as the D2DSS is the same sequence for discovery and communication). TX UE 1220 with discovery can transmit a D2DSS in a same subframe as the TX UE with communication. To make it the same subframe, the subframe in the discovery resource before the next coming discovery period can be used for D2DSS transmission if the discovery pool period is configured not happening to have a first subframe in the period coincidently to be the D2DSS subframe for TX UE 1210 with communication. Or alternatively, the discovery pool period can be shifted or configured to make the D2DSS subframe as the first subframe in the discovery resource pool. The RX UE 1220 with discovery only can need to monitor a D2DSS by discovery; the RX UE 1225 with communication only monitors a D2DSS by communication; and the RX UE 1230 with communication and discovery can monitor a D2DSS by discovery, or can monitor a D2DSS by communication, or monitor both. If a UE monitors a D2DSS by discovery, it can find out the resource pool based on the D2DSS sequence. If it monitors a D2DSS by communication, it can need to further find out a PD2DSCH and find out a PCID, from which it can further find out the resource pool for discovery. If the D2DSS sequence for discovery and communication is the same (for example, cell specific), then, the UE can determine the resource pool for discovery based on the detected D2DSS, without the need to find out a PCID in a PD2DSCH. In the figure, the subframe in the discovery resource right before the next coming discovery period can be used for the D2DSS transmission.

In FIGS. 11-16, the monitoring window size can be similar to the transmission duration of each transmission, or can be slightly larger. The monitoring window can start a litter earlier than the scheduled transmission time.

In FIGS. 15 and 16, the offset for discovery resource pool can have granularity which can be one or multiple of the period of D2DSS transmission. For example, if the period of D2DSS transmission is 40 ms, the offset for discovery resource pool can have granularity of 40 ms, or multiple of 40 ms, such as 80 ms, and the like. This is useful to maintain a stable relative distance of the D2DSS for discovery and the discovery pool period (for example, always the first subframe in the period to be used for the D2DSS, or a certain number of subframes before the start of the period).

When there are multiple TX pools for discovery, if the discovery pool period would shift (for example, by configurable different offsets before the first period with respect to SFN0 would start), it can happen that there can be more than 1 D2DSS for discovery UE transmissions during a period of time duration which are P frames (assume the period is of value P frames). An approach to minimize the number of transmissions can be, for example, to configure the offset for discovery period to start, within a range of values whose distances are no greater than M*40 ms, where M is the number of D2DSS transmission within P frames for UE with discovery. For example, M=1, it means one transmission of D2DSS within P frames. For instance, if there are 4 offsets, each for one discovery pool, then, 4 values for the offsets can be used, and these 4 values can have distances within 40 ms, so that only 1 D2DSS transmission is allowed. Another way is to construct the multiple TX pools as shown in FIGS. 20-23 described below. For example, in FIG. 23, the D2DSS transmission within P frames for the first pool and the second pool can be shared.

In some embodiments, the resource pools for SA and for data utilize offsets to determine their relative location within a scheduling cycle (e.g. one SA period and one data period). For example, for Mode 2 data, the Rx UE will map the time/frequency resources indicated by a Tx UE SA to a set of time/frequency resources within a Mode 2 data pool. This mapping can be accomplish by various methods previously described including a bitmap indicating valid D2D subframes out of a set of subframes (e.g. all UL subframes for FDD or certain UL subframes depending on a given TDD configuration). Therefore within a scheduling cycle, the mode 2 data pool should be preceded in time by the SA pool.

Figure 17:
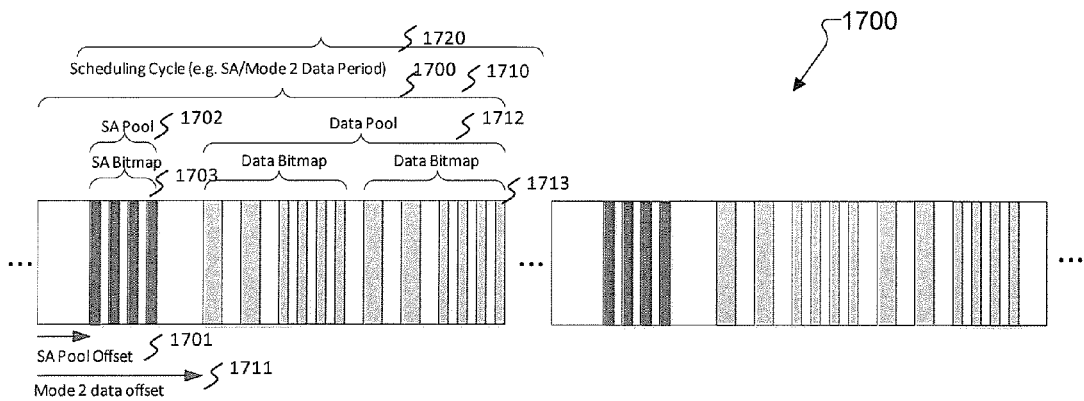
FIG. 17 illustrates a resource pool configuration with a scheduling assignment (SA) pool and mode 2 data pool configured to repeat every scheduling cycle period according to embodiments of the present disclosure.

FIG. 17 illustrates a resource pool configuration 1700 with a scheduling assignment (SA) pool and mode 2 data pool configured to repeat every scheduling cycle period according to embodiments of the present disclosure. The embodiment shown in FIG. 17 is for illustration only. Other embodiments could be used without departing from the scope of the present disclosure.

In an alternative, the scheduling cycle can also start from the beginning of SA bitmap, or SA pool, and end at the beginning of the next instance of SA bitmap or SA pool as illustrated as 1720 in FIG. 17.

In an alternative, the data bitmap can have overlap with SA bitmap, hence, the Mode 2 data offset may not need to be always having a larger value than the SA pool offset.

As previously described in other embodiments, a time offset indicator 1701 can indicate a starting location (e.g. subframe) for a bitmap of SA pool resources 1702 starts within a SA period 1700. In addition to the SA pool, the mode 2 data pool resources 1712 can also have an offset 1411 from the start of a Mode 2 data period 1710. In one alternative the SA and Mode 2 data periods can be different, in a second alternative the SA and mode 2 data periods can correspond to the same value, since both pools are configured within a scheduling cycle. In the case of the second alternative, the Mode 2 data period 1710 and the SA period 1700 can be indicated by a single parameter, for example the SA period 1700 applies to both the SA resource pool as well as the Mode 2 data pool.

Additionally, the Mode 2 pool bitmap may not correspond to the entire duration of the scheduling cycle or SA/Mode 2 data period. Instead it can be repeated one or more times in a consecutive fashion in order to cover all D2D subframes within a Mode 2 data pool. This is beneficial to reduce the amount of signaling overhead for D2D resource pool configuration if the data pool is expected to have a regular structure over the period duration. In this case, the number of repetitions of the Mode 2 data pool should be known by the Tx and Rx D2D UEs. In one alternative the number of repetitions can be indicated by the resource pool configuration. In a second alternative, the number of repetitions can be fixed by network configuration or in the specifications. In a third alternative, the bitmap is repeated until the end of scheduling cycle is reached (e.g. the SA/Mode 2 data period duration). It should be noted the bitmap repetition can also apply to the SA pool as well.

As described previously and shown in FIG. 17, the offset indicator within a SA/Mode 2 Period indicates where the bitmap of Mode 2 data resources used for the pool starts. In one alternative, the Mode 2 data pool offset is with respect to the start of the SA/Mode 2 data period 1400/1410. The network can configure the values of the SA and Mode 2 data offsets independently within a range constrained by the scheduling period duration for SA and/or Mode 2 data. For example the range of the offsets offSet_sa and offset_mode2data can be given by {0, 1, . . . , saPeriod−1} with a granularity of 1 subframe.

However, as mentioned previously, if the SA pool is expected to always precede the Mode 2 data pool, then independent starting offsets are not required and in fact can allow for undesirable configurations where, for example, the Mode 2 data pool can fall outside of the SA/Mode 2 data period after one or more repetitions, resulting in a need for truncation of the bitmap or additional bitmap to subframe mapping complexity to be introduced. As an alternative, the Mode 2 data offset can be relative to the SA bitmap location within the SA/Mode 2 period. In a first alternative, the offset can be relative to the start of the SA pool. In a second alternative, the offset can be relative to the end of the SA pool (including any possible SA bitmap repetitions). This second alternative is beneficial since the end of the SA pool is the earliest starting offset (relative to the start of the SA/Mode 2 data pool), given the constraints of the scheduling cycle previously described. A second benefit of this alternative is that the number of repetitions of the Mode 2 data pool bitmap can be implicitly indicated by this relative offset, since a longer offset will reduce the number of possible repetitions for the bitmap before the end of the SA/Mode 2 data period is reached.

Figure 18:
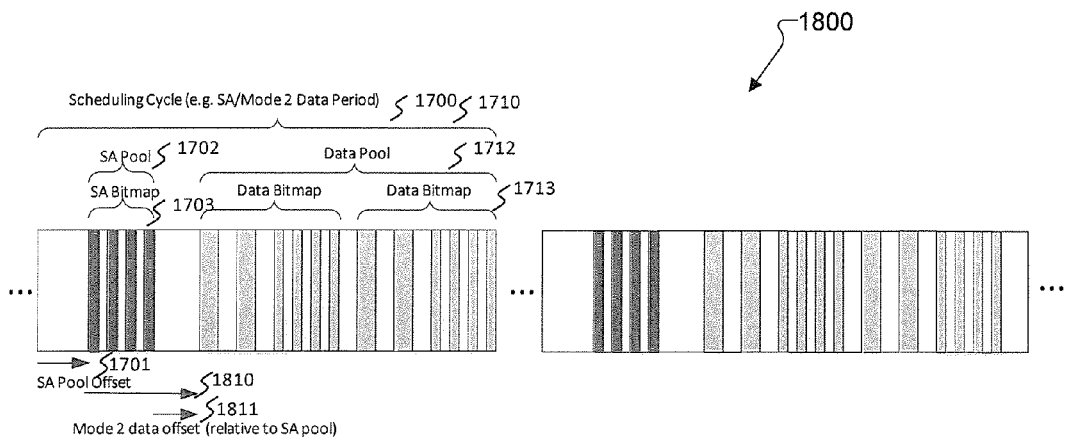
FIG. 18 illustrates another resource pool configuration with a SA pool and mode 2 data pool configured to repeat every scheduling cycle period according to embodiments of the present disclosure.

FIG. 18 illustrates another resource pool configuration 1800 with a SA pool and mode 2 data pool configured to repeat every scheduling cycle period according to embodiments of the present disclosure. The embodiment shown in FIG. 18 is for illustration only. Other embodiments could be used without departing from the scope of the present disclosure.

As illustrated in FIG. 18, the offset of the Mode 2 data pool starts from the end of the SA period. In an alternative, the scheduling cycle can also start from the beginning of SA bitmap, or SA pool, and end at the beginning of the next instance of SA bitmap or SA pool as illustrated as 1720 in FIG. 17.

In the embodiment, an SA pool 1702 can have one SA bitmap 1703. A data pool 1712 can have one or multiple repeated data bitmap 1713. The SA bitmap 1703 and the data bitmap 1713 can have the same size. For FDD case, each bitmap corresponds to a tuple of N-subframes. For TDD case, for each bitmap with length of M bits, it can correspond to a tuple of N-subframes which can include DL subframes, UL subframes, and special subframes, where the bitmap is only for all the UL subframes. For example, for TDD UL-DL configuration 0, M can be 42, and corresponding N is 70. The Mode2 data offset 1810 can be with respect to the start of the SA pool (or the start of SA bitmap). Alternatively, Mode 2 data offset 1811 can be with respect to the ending of SA pool (or the ending of SA bitmap). The unit for offset 1810 or 1811 can be in subframes, or it can alternatively be the number of tuples of N-subframes which correspond to the bitmap length for SA or data.

Figure 19:
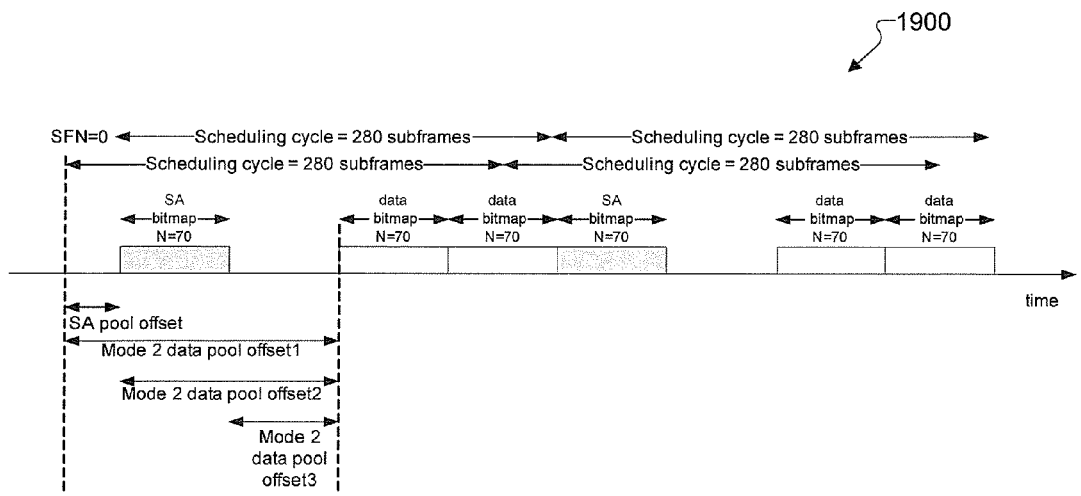
FIG. 19 illustrates a resource pool configuration according to embodiments of the present disclosure.

FIG. 19 illustrates a resource pool configuration 1900 according to embodiments of the present disclosure. The embodiment shown in FIG. 19 is for illustration only. Other embodiments could be used without departing from the scope of the present disclosure.

In the embodiment, the scheduling cycle is 280 subframes. A tuple of N-subframes corresponds to an SA bitmap, or a data bitmap. In a scheduling cycle, an SA bitmap starts at a SA pool offset time, with respect to SFN=0 (this SFN can be serving cell's if the offset is for the pool of the serving cell, or the neighboring cells if the offset is with respect to the pool of the neighboring cell). The data bitmap starts at Mode 2 data pool offset1 with respect to SFN=0. The data bitmap can be repeated until the next instance of SA bitmap. Or alternatively, the data bitmap starts at Mode 2 data pool offset 2 with respect to the start of SA bitmap. Or alternatively, the data bitmap starts at Mode2 data pool offset3 with respect to the ending of SA bitmap. Mode 2 data pool offset1=SA pool offset+Mode 2 data pool offset2, or Mode 2 data pool offset1=SA pool offset+N+Mode 2 data pool offset3 (in the unit of subframes). If Mode 2 data pool offset2 or Mode 2 data pool offset3 is in the unit of number of tuples of N-subframes corresponding to a bitmap, Mode 2 data pool offset1=SA pool offset+(Mode 2 data pool offset2)*N, or Mode 2 data pool offset1=SA pool offset+ (1+Mode 2 data pool offset3)*N (in the unit of subframes). The SA pool offset can also include the offset of SFN0 of neighboring cell with respect to SFN0 of serving cell if the pool is for neighboring cell. In an alternative, the scheduling cycle can also start from the beginning of SA bitmap, or SA pool, and end at the beginning of the next instance of SA bitmap or SA pool.

If Mode 2 data pool offset2 or Mode 2 data pool offset3 are not of integer tuple of N-subframes, for example, partial tuple of N-subframes (for instance, N=70, while Mode 2 data pool offset3 is 40 subframes), then it can happen that data bitmap repetition can have a partial bitmap until the beginning of next SA bitmap. An alternative is not to have the partial repetition of bitmap right before the next SA bitmap. In an alternative, instead of repetitions until the next SA bitmap, the number of repetitions can be provided, and the bitmap repeats based on the repetition number.

The configuration of the SA and Mode 2 data pool offsets can be accomplished through multiple methods, including preconfiguration at the UE, common control signaling (e.g. SIB), or dedicated signaling (e.g. RRC). Table 10 provides an example configuration of the offset parameters. It should be noted that the parameters can have a default value or if omitted from a configuration message, the UE can assume a default value or that an offset is not applied (e.g. the Mode 2 data pool starts immediately after the end of the SA pool with 0 subframe offset).

In Table 10, the number G can be dependent on the scheduling cycle. For example, for N=40, for scheduling cycle S=320 subframes, G can be 7, if Mode1 data pool offset is with respect to the ending of SA pool (the possible values for the offset is 0, 1, 2, . . . , 6, if the unit is the number of tuples of N-frames. Here, N is a bitmap duration indicating how many subframes the bitmap covers, S is a scheduling cycle indicating how many subframes it has in a cycle period, and G indicates an offset change. For N=40, S=160, G can be 3. Basically, G can be (S/N−1), if Mode2 data pool offset is with respect to the ending of SA pool, if the unit for the offset is the number of tuples of N-frames, for scheduling cycle S.

TABLE 10

Resource Pool Offset Configuration

| | Size (bits) | Information |
|---|---|---|
| . . . | . . . | . . . |
| SA pool offset | Ceiling(log$_2$(F)) | In the unit of subframes. Offset of SA pool bitmap, with respect to the serving (or potentially neighboring cell's) SFN 0. F is the total number of possible values for the offset. |
| Mode 2 data pool offset | Ceiling(log$_2$(G)) | In the unit of subframes. Offset of the mode 2 data pool bitmap, with respect to the serving cell (or potentially neighboring cell's) SFN 0. G is the total number of possible values for the offset. G can be depending to the scheduling cycle.<br>Alternatively, this offset is with respect to the start of the SA pool. (or the start of SA bitmap).<br>Alternatively, this offset is with respect to the ending of SA pool (or the ending of SA bitmap).<br>The unit can alternatively be the number of tuples of subframes which correspond to the bitmap length for SA or data.<br>A default value can be 0. (If this field is omitted, it can mean the offset is 0). |
| . . . | . . . | . . . |

Figure 20:
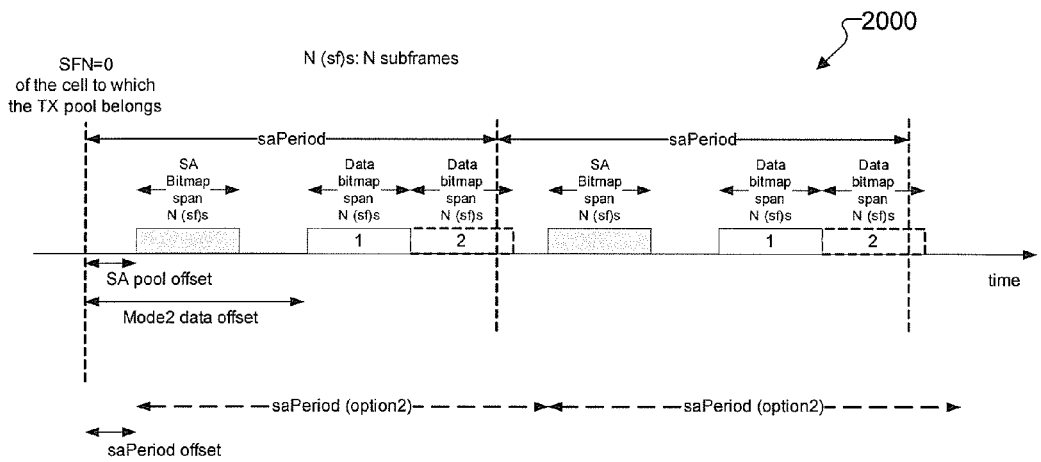
FIG. 20 illustrates another resource pool configuration according to embodiments of the present disclosure.

FIG. 20 illustrates another resource pool configuration 2000 according to embodiments of the present disclosure. The embodiment shown in FIG. 20 is for illustration only. Other embodiments could be used without departing from the scope of the present disclosure.

In FIG. 20, two options for the saPeriod can be defined, where the saPeriod can also refer to as the scheduling cycle, or scheduling period, or the period of scheduling assignment. Option 1 is that the saPeriod can start from SFN 0 of the cell to which the resource pool belongs, and the SA pool offset starting also from SFN 0 can be within the saPeriod. Option 2 is that saPeriod can start after a saPeriod offset, for example, the first saPeriod starts after the saPeriod offset which is with respect to SFN 0 of the cell (which can be serving cell, or can be extended to neighboring cell where the offset for the neighboring cell's saPeriod can be with respect to the serving cell's SFN0, i.e., the offset of saPeriod of the neighboring cell can start at the SFN0 of the serving cell). The saPeriod offset can be also named as saOffset or other names. SA bitmap starts at the beginning of saPeriod. For Option 2, the Mode 2 data offset can start from the beginning of SA bitmap (or, equivalently, the start of the saPeriod), or the ending of the SA bitmap (if the data bitmap is not overlapping with SA bitmap). The saPeriod definition shown in FIG. 20 can also be similar for discovery period, and Option2 is also described together with the content in Table 5.

Figure 21:
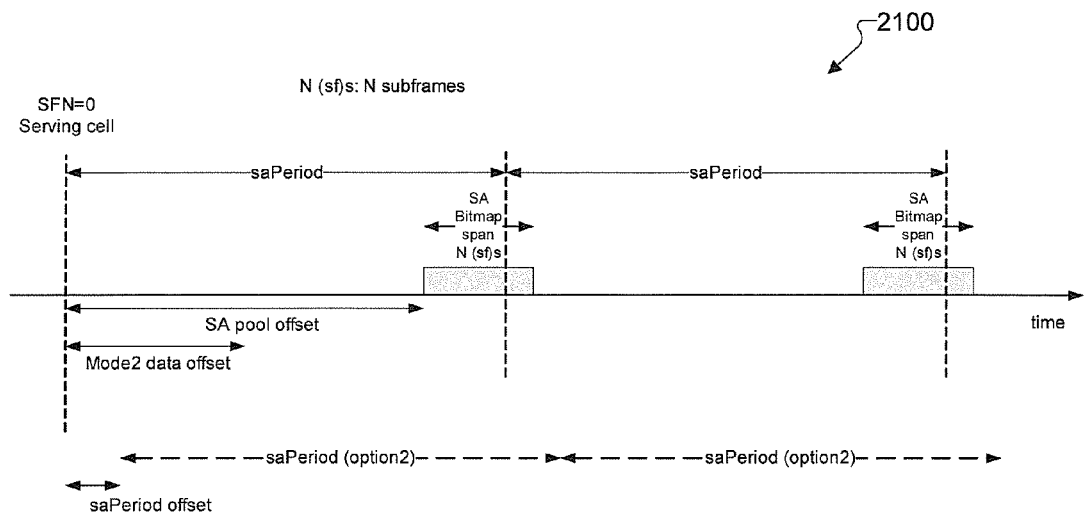
FIG. 21 illustrates another resource pool configuration in which the SA bitmap can roll over to the next saPeriod according to embodiments of the present disclosure.

FIG. 21 illustrates another resource pool configuration 2100 in which the SA bitmap can roll over to the next saPeriod if the saPeriod is defined as in Option 1, according to embodiments of the present disclosure. The embodiment shown in FIG. 21 is for illustration only. Other embodiments could be used without departing from the scope of the present disclosure.

Figure 22:
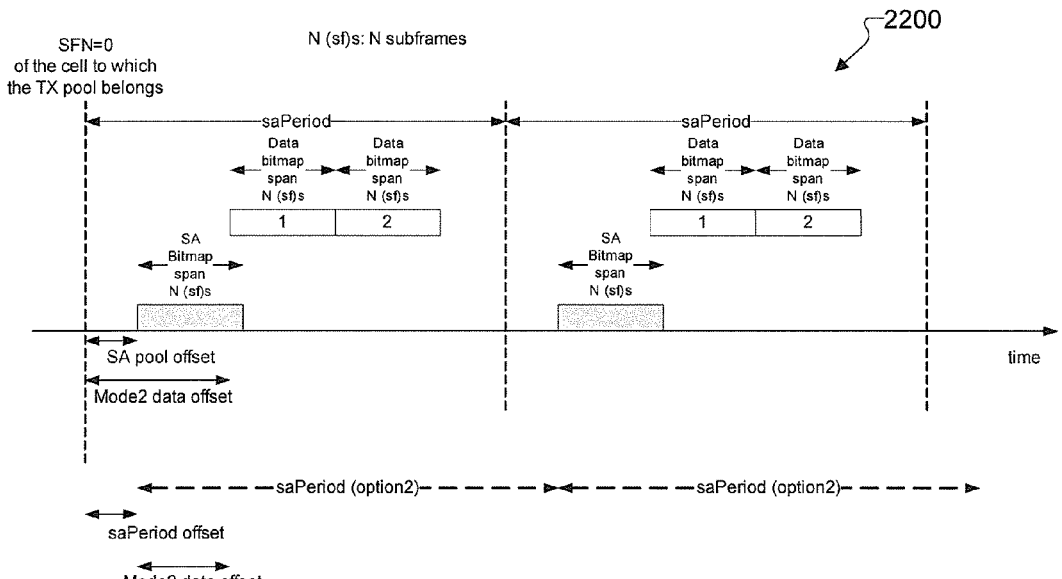
FIG. 22 illustrates another resource pool configuration in which the SA bitmap and data bitmap span can overlap according to embodiments of the present disclosure.

FIG. 22 illustrates another resource pool configuration 2200 in which the SA bitmap and data bitmap span can overlap. The embodiment shown in FIG. 22 is for illustration only. Other embodiments could be used without departing from the scope of the present disclosure.

For the overlapped portion (e.g., subframes), each subframe can only be indicated or declared by one of these two bitmaps. For example, for subframe k in the overlapped portion, either SA bitmap will have '1', or data bitmap will have '1', and it cannot be the case that both bitmaps have '1' for this subframe k, i.e., it would be an error case if both bitmaps declare the subframe as its resources. Mode2 data offset can begin at the beginning of the saPeriod after the saPeriod offset, as shown for saPeriod option 2.

Figure 23:
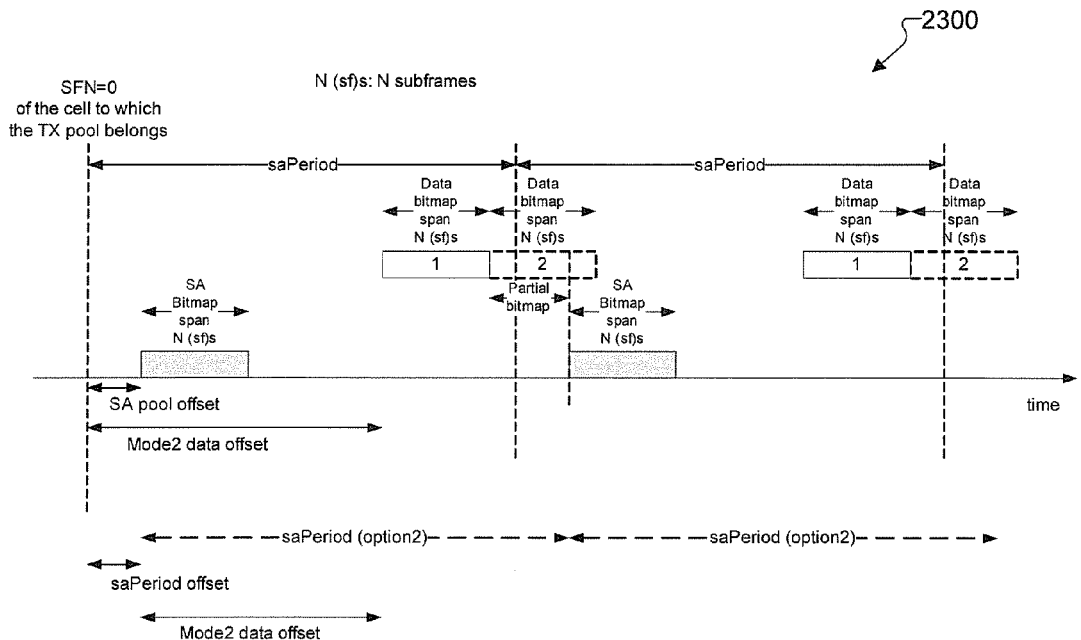
FIG. 23 illustrates another resource pool configuration in which the SA bitmap and data bitmap span can overlap according to embodiments of the present disclosure.

FIG. 23 illustrates another resource pool configuration 2300 in which the SA bitmap and data bitmap span can overlap, or a partial bitmap for the data bitmap span can be supported. The embodiment shown in FIG. 23 is for illustration only. Other embodiments could be used without departing from the scope of the present disclosure.

One or multiple resource pool configurations to have multiple resource pools can be considered as follows.

For each of the options in above FIG. 20, a first method to support multiple resource pools for SA, or for data bitmap, is that the bitmap itself can be used to indicate orthogonal resource set, by having orthogonal bits corresponding to a different set of the resources (subframes). For example, for a bitmap of length 40, the first 20 bits can be used for a first resource pool, and the second 20 bit can be used for a second resource pool. Or, the even numbered bits (the $2^{nd}$, $4^{th}$, $6^{th}$ . . . ) can be used for the first resource pool, and the odd numbered bits (the $1^{st}$, $3^{rd}$, $5^{th}$, . . . ) can be used for the second resource pool.

A second method to have multiple resource pools can be by using the different offset values together with corresponding repetition number for a respective bitmap.

Figure 24:
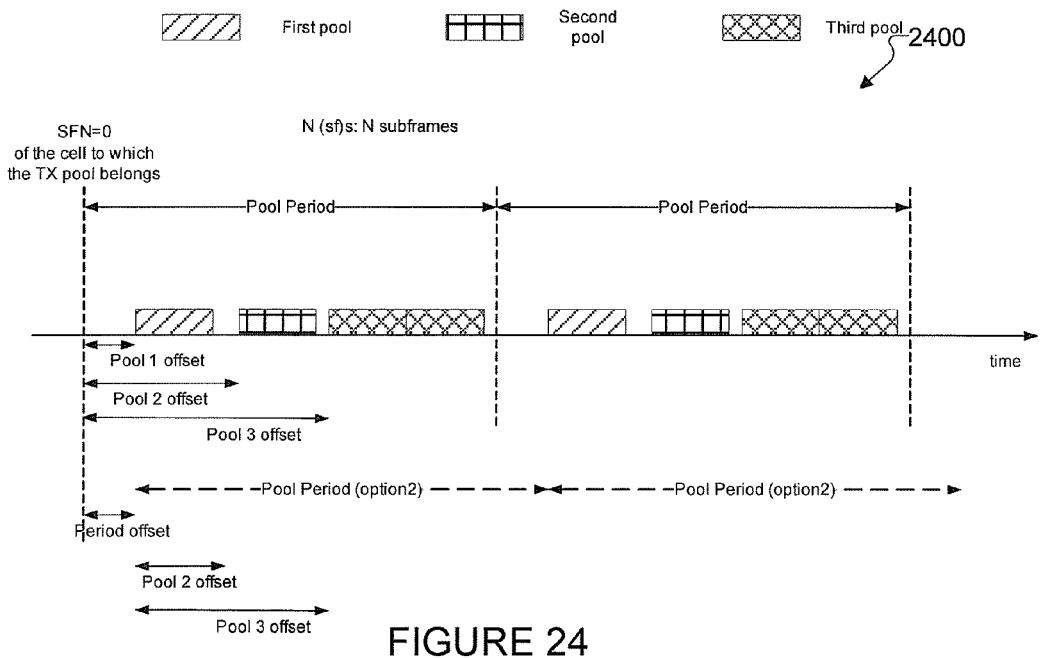
FIG. 24 illustrates multiple resource pools configuration according to embodiments of the present disclosure.

FIG. 24 illustrates multiple resource pools configuration according to embodiments of the present disclosure. The embodiment shown in FIG. 24 is for illustration only. Other embodiments could be used without departing from the scope of the present disclosure.

In the embodiment, the first pool has a bitmap with repetition number as 1 (where the repetition number includes both the first bitmap as well as the repeated bitmaps), the second pool has a bitmap with repetition number 1, and the third pool has a bitmap with repetition number 2. The corresponding offsets can be with respect to SFN0, or can be with respect to the starting of the pool period (for example, the pool period in Option 2). The offset can be also relative offset, e.g., with respect to the starting of the first pool, or the ending of the first pool, and the like.

A third method to have multiple resource pools can be by using different period definition, and different offset values, for different resource pools.

FIG. 25 illustrates another multiple resource pools configuration 2500 according to embodiments of the present disclosure. The embodiment shown in FIG. 25 is for illustration only. Other embodiments could be used without departing from the scope of the present disclosure.

In the embodiment, each pool can have its own period definition, and corresponding offset for the period. This example can also be extended to the period definition Option 1, where the period starts from SFN 0.

Figure 26:
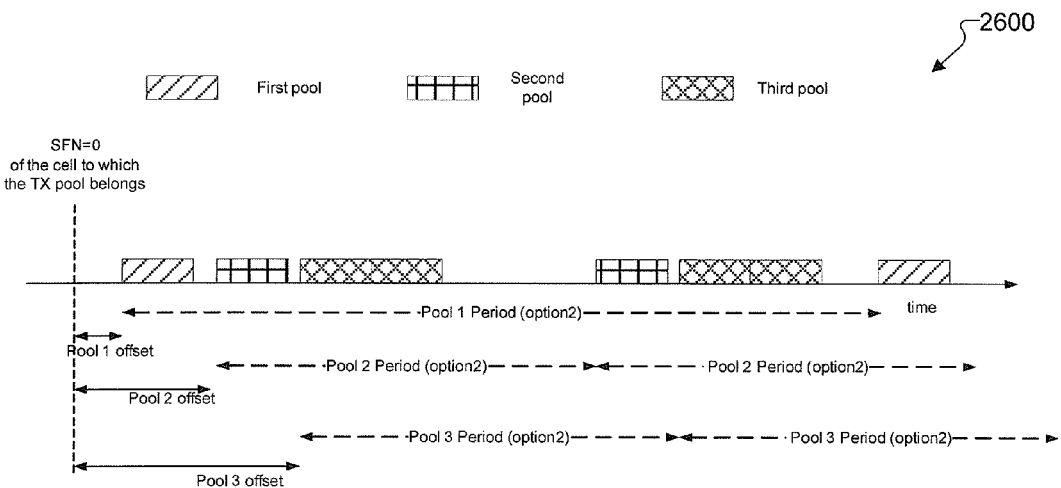
FIG. 26 illustrates another multiple resource pools configuration in which different pools can have same/different periodicities according to embodiments of the present disclosure.

FIG. 26 illustrates another multiple resource pools configuration 2600 in which different pools can have same/different periodicities, according to embodiments of the present disclosure. The embodiment shown in FIG. 26 is for illustration only. Other embodiments could be used without departing from the scope of the present disclosure.

In the embodiment, each pool can have its own period definition, and corresponding offset for the period. Pool 1 period can be different from the period for other pools. This example can also be extended to the period definition Option 1, where the period starts from SFN 0.

A fourth method to have multiple resource pools can be by using different set of durations where each duration is of a period length. For example, a first pool can use even numbered period, and a second pool can use odd numbered period.

Figure 27:
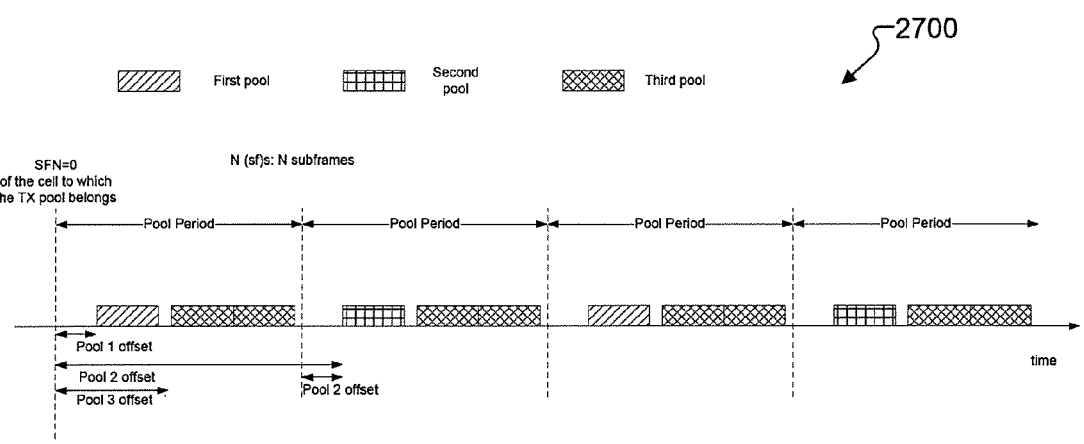
FIG. 27 illustrates another multiple resource pools configuration according to embodiments of the present disclosure.

FIG. 27 illustrates another multiple resource pools configuration 2700 according to embodiments of the present disclosure. The embodiment shown in FIG. 27 is for illustration only. Other embodiments could be used without departing from the scope of the present disclosure.

In the embodiments, the first pool appears in the even numbered period (period #0, 2, 4, . . . ), and the second pool appears in the odd numbered period (period #1, 3, 5, . . . ), and the third pool appears in each period. This example can also be extended to the period definition Option 2, where the period starts from after a certain offset.

A fifth method is to use the frequency domain resource separation for the resource pool, i.e., different resources in frequency domain for different resource pools. This method can also be combined with the time domain methods (for example, method 1-4).

The above embodiments can be applicable for D2D discovery, or D2D communication.

The formation of a resource pool can be at layer 1, or it can be at layer 2. For example, if layer 1 defines some resources for a pool, layer 2 can also form a rule to form one or multiple pools based on the resources given by layer 1. For example, in FIG. 23, layer 1 can define resource pool based on the Pool period, and layer 2 can further define pools 1, 2, and 3; or alternatively, layer 1 can define pools 1, 2, and 3.

In one embodiment, for a Period, the value of the period can happen not to be an integer multiple of the time duration for the SFN range, where the SFN range is determined by the number of bits to indicate SFN index. For example, a SFN has 10 bits, then, the SFN range is 0-1023. For example, the saPeriod can be {70,140,280} ms for TDD UL-DL configuration 0, and {60,120,240} ms for TDD UL-DL configuration 6, then there will be a partial period or a fractional period in the SFN range 0-1023.

If Option 1 for the definition of the period (i.e., the period starts at SFN0) is used, at the end of the SFN range 0-1023, a partial (fractional) period can be used, and the pattern for SFN range 0-1023 can be repeated every 1024 frames. Alternatively, the fractional period can be at the beginning of the SFN range 1-1023.

If Option 2 in for the definition of the period (i.e., the period starts after a certain offset) is used, the pattern for SFN range 0-1023 can be shifted by an offset (for example, SA period offset), and the pattern can be repeated every 1024 frames starting from the ending of the offset.

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A method for device-to-device (D2D) communication in a wireless communication network, the method comprising:
   detecting a D2D synchronization signal of a neighbor base station, transmitted from at least one other UE associated with the neighbor base station through a transceiver;
   determining at least one User Equipment (UE) receive (RX) resource pool configured by the neighbor base station based on the detected D2D synchronization signal; and
   monitoring a D2D discovery or communication signal, transmitted from the at least one other UE according to the determined at least one UE RX resource pool,
   wherein each UE RX resource pool comprises a repetition of a Scheduling Assignment (SA) pool and a data pool with a scheduling cycle, the SA pool comprising a SA bitmap and the data pool comprising at least one repeated data bitmap,
   wherein the SA pool starts with an offset from a start of the scheduling cycle and the data pool starts with an offset from either the start of the scheduling cycle, a start of the SA pool, or an end of the SA pool.

2. The method of claim 1, further comprising:
   determining whether the neighbor base station supports either D2D discovery only or D2D discovery and communication;
   in response to the neighbor base station supporting the D2D discovery only, monitoring a D2D synchronization signal by discovery transmitted from the at least one other UE; and
   in response to the neighbor base station supporting the D2D discovery and communication, monitoring a D2D synchronization signal by discovery and communication transmitted from the at least one other UE.

3. The method of claim 2, wherein each UE RX resource pool comprises a plurality of subframes containing either D2D synchronization signals by discovery or D2D synchronization signals by discovery and communication, and a first monitoring window between subframes containing the D2D synchronization signals by discovery is greater than a second monitoring window between subframes containing the synchronization signals by discovery and communication.

4. The method of claim 3, wherein the subframes containing the D2D synchronization signals by discovery either overlap a part of the subframes containing the D2D synchronization signals by discovery and communication, or are different from the subframes containing the D2D synchronization signals by discovery and communication.

5. The method of claim 1, further comprising:
receiving a carrier index and a physical cell identity (PCID) of the neighbor base station from the at least one other UE.

6. The method of claim 1, wherein at least one UE RX resource pool comprises a plurality of RX resource pools for D2D communication between a respective group of devices, each RX resource pool comprising the repetition of a SA pool and a data pool with a respective pool period.

7. The method of claim 6, wherein the plurality of RX resource pools are repeated in a pool period, and each RX resource pool has a respective different offset from a start of the pool period.

8. A method for device-to-device (D2D) communication in a wireless communication network, the method comprising:
determining at least one User Equipment (UE) receive (RX) resource pool for at least one device associated with a base station, each UE RX resource pool comprising a repetition of a Scheduling Assignment (SA) pool and a data pool with a scheduling cycle, the SA pool comprising a SA bitmap, and the data pool comprising at least one repeated data bitmap;
transmitting the determined at least one UE RX resource pool to the at least one device,
wherein the SA pool starts with an offset from a start of the scheduling cycle, and the data pool starts with an offset from either the start of the scheduling cycle, a start of the SA pool, or an end of the SA pool.

9. A device for device-to-device (D2D) communication in a wireless communication network, the device comprising:
a transceiver configured to communicate with another device;
a processor configured to:
detect a D2D synchronization signal of a neighbor base station, transmitted from at least one other User Equipment (UE) associated with the neighbor base station through the transceiver;
determine at least one UE receive (RX) resource pool configured by the neighbor base station based on the detected D2D synchronization signal; and
monitor a D2D discovery or communication signal transmitted from the at least one other UE according to the determined at least one UE RX resource pool through the transceiver,
wherein each UE RX resource pool comprises a repetition of a Scheduling Assignment (SA) pool and a data pool with a scheduling cycle, the SA pool comprising a SA bitmap and the data pool comprising at least one repeated data bitmap, and
wherein the SA pool starts with an offset from a start of the scheduling cycle and the data pool starts with an offset from either the start of the scheduling cycle, a start of the SA pool, or an end of the SA pool.

10. The device of claim 9, wherein the processor is further configured to:
determine whether the neighbor base station supports either D2D discovery only or D2D discovery and communication;
in response to the neighbor base station supporting the D2D discovery only, monitor a D2D synchronization signal by discovery transmitted from the at least one other UE through the transceiver; and
in response to the neighbor base station supporting the D2D discovery and communication, monitor a D2D synchronization signal by discovery and communication transmitted from the at least one other UE through the transceiver.

11. The device of claim 10, wherein each UE RX resource pool comprises a plurality of subframes containing either D2D synchronization signals by discovery or D2D synchronization signals by discovery and communication, and a first monitoring window between subframes containing the D2D synchronization signals by discovery is greater than a second monitoring window between subframes containing the D2D synchronization signals by discovery and communication.

12. The device of claim 11, wherein the subframes containing the D2D synchronization signals by discovery either overlap a part of the subframes containing the D2D synchronization signals by discovery and communication, or are different from the subframes containing the D2D synchronization signals by discovery and communication.

13. The device of claim 9, wherein the processor is further configured to receive a carrier index and a physical cell identity (PCID) of the neighbor base station from the at least one other UE.

14. The device of claim 9, wherein at least one UE RX resource pool comprises a plurality of RX resource pools for D2D communication between a respective group of devices, each RX resource pool comprising the repetition of a SA pool and a data pool with a respective pool period.

15. The device of claim 14, wherein the plurality of RX resource pools are repeated in a pool period, and each RX resource pool has a respective different offset from a start of the pool period.

16. A base station for device-to-device (D2D) communication in a wireless communication network, the base station comprising:
a processor configured to determine at least one User Equipment (UE) receive (RX) resource pool for at least one device associated with the base station, each UE RX resource pool comprising a repetition of a Scheduling Assignment (SA) pool and a data pool with a scheduling cycle, the SA pool comprising a SA bitmap, and the data pool comprising at least one repeated data bitmap;
a transceiver configured to transmit the determined at least one UE RX resource pool to the at least one device,
wherein the SA pool starts with an offset from a start of the scheduling cycle, and the data pool starts with an offset from either the start of the scheduling cycle, a start of the SA pool, or an end of the SA pool.

* * * * *